(12) United States Patent
Zhang et al.

(10) Patent No.: US 11,777,826 B2
(45) Date of Patent: Oct. 3, 2023

(54) TRAFFIC MONITORING METHOD AND APPARATUS, INTEGRATED CIRCUIT, AND NETWORK DEVICE

(71) Applicant: Huawei Technologies Co., Ltd., Guangdong (CN)

(72) Inventors: Zhengyi Zhang, Chengdu (CN); Jing Hu, Beijing (CN); Feiran Yang, Beijing (CN); Haifeng Wu, Shenzhen (CN); Wei Song, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/173,662

(22) Filed: Feb. 23, 2023

(65) Prior Publication Data
US 2023/0216769 A1  Jul. 6, 2023

Related U.S. Application Data

(63) Continuation of application No. PCT/CN2021/081657, filed on Mar. 19, 2021.

(30) Foreign Application Priority Data

Aug. 26, 2020  (CN) .......................... 202010873634.3
Nov. 6, 2020   (CN) .......................... 202011235536.3

(51) Int. Cl.
| | | |
|---|---|---|
| *G06F 15/16* | (2006.01) | |
| *H04L 43/0876* | (2022.01) | |
| *H04L 41/142* | (2022.01) | |
| *H04L 43/16* | (2022.01) | |

(52) U.S. Cl.
CPC ........ *H04L 43/0876* (2013.01); *H04L 41/142* (2013.01); *H04L 43/16* (2013.01)

(58) Field of Classification Search
CPC .... H04L 41/142; H04L 43/0876; H04L 43/16
USPC ......................................................... 709/224
See application file for complete search history.

(56) References Cited

U.S. PATENT DOCUMENTS

| 7,644,157 | B2 * | 1/2010 | Shomura ............... H04L 43/026 709/224 |
| 8,059,559 | B2 * | 11/2011 | Bugenhagen ....... H04L 43/0888 370/253 |
| 9,148,359 | B2 * | 9/2015 | Kruger ................... H04L 43/12 |
| 2007/0244864 | A1 * | 10/2007 | Musko .................... H04L 43/16 |

(Continued)

*Primary Examiner* — Moustafa M Meky
(74) *Attorney, Agent, or Firm* — WOMBLE BOND DICKINSON (US) LLP

(57) ABSTRACT

Embodiments of this application disclose a traffic monitoring method and apparatus, an integrated circuit, and a network device. When the traffic monitoring apparatus receives a packet, after determining that the traffic monitoring apparatus includes an empty first register, the traffic monitoring apparatus updates a value of first information in the first register to a measured value of a target performance indicator of the packet, and increases a value of second information in the first register by 1. The value of the second information in the first register is 0, the first information in the first register indicates a depth of a data bucket that carries a measured value of the target performance indicator of a to-be-monitored packet, and the second information in the first register indicates a quantity of packets that are in received packets and that match the value of the first information in the first register.

30 Claims, 13 Drawing Sheets

(56) References Cited

U.S. PATENT DOCUMENTS

| | | | |
|---|---|---|---|
| 2007/0271374 A1* | 11/2007 | Shomura | H04L 43/026 709/224 |
| 2008/0144523 A1* | 6/2008 | Nishi | H04L 43/06 370/253 |
| 2010/0061266 A1* | 3/2010 | Bugenhagen | H04L 47/74 370/253 |
| 2012/0076044 A1* | 3/2012 | Bugenhagen | H04L 47/74 370/253 |
| 2013/0163446 A1* | 6/2013 | Kruger | H04L 43/12 370/252 |

* cited by examiner

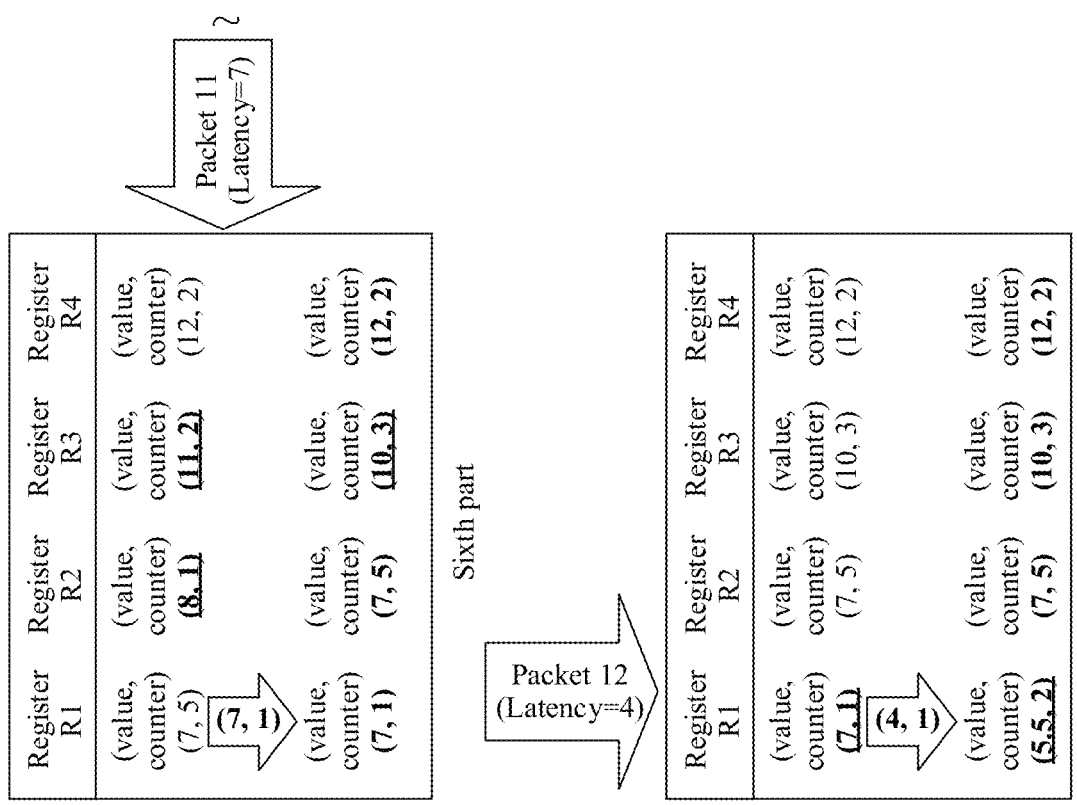

| Register R1 | Register R2 | Register R3 | Register R4 |
|---|---|---|---|
| (value, counter) (7, 1) | (value, counter) (8, 1) | (value, counter) (12, 1) | |

Third part

⟹ Packet 4' (Latency=7)

| Register R1 | Register R2 | Register R3 | Register R4 |
|---|---|---|---|
| (value, counter) (7, 2) | (value, counter) (8, 1) | (value, counter) (12, 1) | |

Fourth part

⇧ Packet 3 (Latency=8)

CONT. FROM FIG. 4b-1

...

| Register R1 | Register R2 | Register R3 | Register R4 |
|---|---|---|---|
| (value, counter) (7, 5) | (value, counter) (8, 1) | (value, counter) (11, 2) | (value, counter) (12, 2) |

Fifth part

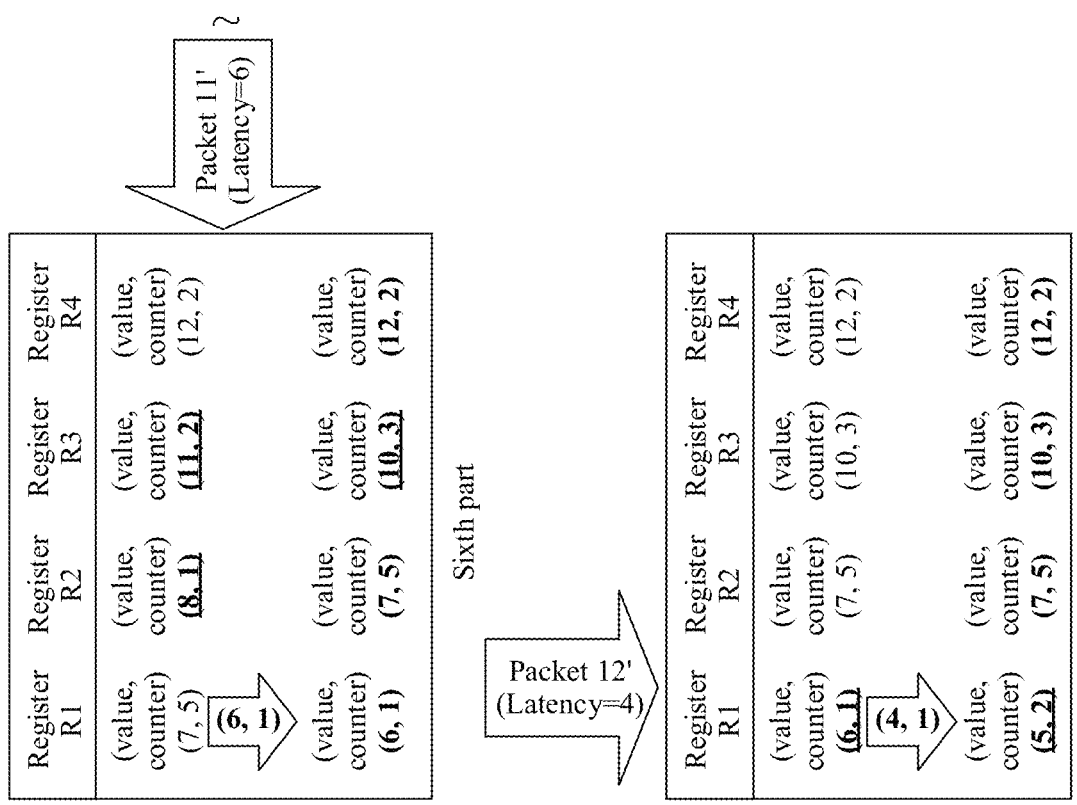

TRAFFIC MONITORING METHOD AND APPARATUS, INTEGRATED CIRCUIT, AND NETWORK DEVICE

CROSS-REFERENCE TO RELATED APPLICATIONS

This application is a continuation of International Application No. PCT/CN2021/081657, filed on Mar. 19, 2021, which claims priority to Chinese Patent Application No. 202010873634.3, filed on Aug. 26, 2020, and Chinese Patent Application No. 202011235536.3, filed on Nov. 6, 2020. All of the aforementioned patent applications are hereby incorporated by reference in their entireties.

TECHNICAL FIELD

This application relates to the field of communication technologies, and in particular, to a traffic monitoring method and apparatus, an integrated circuit, and a network device.

BACKGROUND

In a network operating process, distribution of values of performance indicators, for example, a packet latency and a chip port queue length, can reflect a network operating status. All the values of the performance indicators are stored, so that the distribution of the values can be accurately calculated. However, a large quantity of storage resources need to be occupied in this manner. To reduce a storage requirement, distribution of values of various performance indicators is roughly collected through histogram statistics. In a histogram statistics algorithm, a value range corresponding to each performance indicator needs to be preset and equally divided into corresponding data buckets. The configuration is complex. In addition, for different data streams or a same data stream at different phases, it cannot be ensured whether the configured value range and division into depths of the data buckets are appropriate, leading to poor statistical precision.

SUMMARY

Based on this, embodiments of this application provide a traffic monitoring method and apparatus, an integrated circuit, and a network device, to simply and accurately collect statistics on various performance indicators of a received packet. In this way, an actual status of the network device can be accurately reflected based on a small quantity of storage resources.

According to a first aspect, an embodiment of this application provides a traffic monitoring method. For example, the method may include: When receiving a first packet, a traffic monitoring apparatus determines whether the traffic monitoring apparatus includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the traffic monitoring apparatus and that match a value of the first information in the first register. In response to determining, by the traffic monitoring apparatus, that the traffic monitoring apparatus includes the first register, the traffic monitoring apparatus updates the value of the first information in the first register to a measured value of the target performance indicator of the first packet, and increases the value of the second information in the first register by 1. In this way, a value range of the target performance indicator does not need to be configured, and the value range does not need to be equally divided to determine a depth of each data bucket either. Instead, the first information indicating the depth of the data bucket that carries the measured value of the target performance indicator of the to-be-monitored packet, and the second information indicating the quantity of packets that are in the received packets and that match the value of the first information in each register are used as two statistical parameters of the register, to flexibly update values of the two statistical parameters in each register according to the measured value of the target performance indicator of the received packet, so that statistics on the target performance indicator are collected. This not only reduces configuration workload for collecting the statistics on the target performance indicator, but also makes it possible to obtain a more comprehensive and accurate statistical result because an entire statistical value range and a statistical value sub-range of each register are not limited. Therefore, an actual operating status of the network device can be learned more accurately.

It can be noted that, in the method provided in this embodiment of this application, a larger quantity of registers used for statistics collection in the traffic monitoring apparatus indicates a more accurate statistical result.

Each register corresponds to one data bucket. The data bucket collects statistics on a packet whose measured value of the target performance indicator falls within a specific range. A value of the first information and a value of the second information are recorded in the data bucket. The value of the first information refers to the measured value or a range of the measured value of the packet on which the statistics are collected in the data bucket, and the value of the second information refers to a quantity of packets on which the statistics are collected in the data bucket. A statistical result recorded in the data bucket is stored in the corresponding register. A depth of a data bucket corresponding to a register may be used as a value of the first information in the register, and a quantity of packets falling within a corresponding range of the depth of the corresponding data bucket may be used as a value of the second information in the register corresponding to the data bucket.

In an embodiment, the method may further include: When receiving a second packet, the traffic monitoring apparatus determines whether the traffic monitoring apparatus includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the traffic monitoring apparatus and that match a value of the first information in the second register. In this case, in response to determining, by the traffic monitoring apparatus, that the traffic monitoring apparatus does not include the second register, the traffic monitoring apparatus performs the following operations: updating, according to a value of the first information in a third register included in the traffic monitoring apparatus and a value of the second information in the third register, a value of the first information in a fourth register included in the traffic monitoring apparatus and a value of the second information in the fourth register, where an updated value of the second information in the fourth register is equal to a sum of the value of the second information in the third register and the value of the second information in the fourth register; and clearing the value of the second information in the third register. It can be learned that, in the method, the first information indicating the depth of the data bucket that carries the measured value of the target performance indicator of the to-be-monitored packet, and the second information indicating the quantity of packets that are in the received packets and that match the value of the first information in each register are used as two statistical parameters of the register, to flexibly update values of the two statistical parameters in each register according to the measured value of the target performance indicator of the received packet, so that statistics on the target performance indicator are collected when it is determined that there is no empty register. This not only reduces configuration workload for collecting the statistics on the target performance indicator, but also makes it possible to obtain a more comprehensive and accurate statistical result because an entire statistical value range and a statistical value sub-range of each register are not limited. Therefore, an actual operating status of the network device can be learned more accurately.

In this implementation, the determined third register and the determined fourth register are two sorted adjacent registers. A manner of determining the third register and the fourth register in adjacent registers includes but is not limited to the following four possible implementations.

In an example, the third register is adjacent to the fourth register, and the sum of the value of the second information in the third register and the value of the second information in the fourth register is less than a first threshold.

In another example, the third register is adjacent to the fourth register, and a weighted sum of the value of the second information in the third register and the value of the second information in the fourth register is less than a first threshold.

In still another example, the third register is adjacent to the fourth register, and the sum of the value of the second information in the third register and the value of the second information in the fourth register is not greater than a sum of values of the second information in any two adjacent registers included in the traffic monitoring apparatus.

In yet another example, the third register is adjacent to the fourth register, and a weighted sum of the value of the second information in the third register and the value of the second information in the fourth register is not greater than a weighted sum of values of the second information in any two adjacent registers included in the traffic monitoring apparatus. It can be learned that, according to the method provided in the foregoing example, the third register and the fourth register in the traffic monitoring apparatus can be accurately determined. This provides a data basis for ensuring precision of implementing traffic monitoring by the traffic monitoring apparatus.

In an embodiment, the method may further include: The traffic monitoring apparatus determines that a measured value of the target performance indicator of the second packet matches an updated value of the first information in the fourth register. The traffic monitoring apparatus increases the value of the second information in the fourth register by 1. In an example, that the traffic monitoring apparatus determines that a measured value of the target performance indicator of the second packet matches an updated value of the first information in the fourth register may include: The traffic monitoring apparatus determines that the measured value of the target performance indicator of the second packet falls within a value range corresponding to the value of the first information in the fourth register. In another example, that the traffic monitoring apparatus determines that a measured value of the target performance indicator of the second packet matches an updated value of the first information in the fourth register may include: The traffic monitoring apparatus determines that a difference between the measured value of the target performance indicator of the second packet and the value of the first information in the fourth register is less than a difference between the measured value of the target performance indicator of the second packet and a value of the first information in another register. In this way, after the third register and the fourth register are updated, statistics are quickly collected on the target performance indicator of the second packet by using the fourth register.

In an embodiment, the method may further include: The traffic monitoring apparatus determines that a measured value of the target performance indicator of the second packet does not match an updated value of the first information in the fourth register. The traffic monitoring apparatus updates the value of the first information in the third register to the measured value of the target performance indicator of the second packet, and increases the value of the second information in the third register by 1. In this way, after the third register and the fourth register are updated, statistics are quickly collected on the target performance indicator of the second packet by using the third register.

In an embodiment, the method may further include: When the traffic monitoring apparatus receives a third packet, the traffic monitoring apparatus determines that a measured value of the target performance indicator of the third packet matches the value of the first information in the third register. In this case, the traffic monitoring apparatus increases the value of the second information in the third register by 1. In this way, statistics on the packet whose measured value of the target performance indicator matches the value of the first information of the register are collected more quickly and effectively.

The third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the traffic monitoring apparatus are arranged in ascending order of values of the first information in the registers. Alternatively, the registers in the traffic monitoring apparatus are arranged in descending order of values of the first information in the registers.

In this embodiment of this application, the target performance indicator includes any one of the following indicators: a latency, a packet length, a packet receiving time interval, or queue usage.

In this embodiment of this application, the traffic monitoring apparatus is included in a processing chip, for example, may be integrated into a network processor (NP for short) chip.

According to a second aspect, an embodiment of this application provides a traffic monitoring apparatus. The traffic monitoring apparatus may include, for example, a first receiving unit, a first determining unit, and a second determining unit. The first receiving unit is configured to receive a first packet. The first determining unit is configured to determine whether the traffic monitoring apparatus includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the traffic monitoring apparatus and that match a value of the first information in the first register. The second determining unit is configured to: in response to determining, by the traffic monitoring apparatus, that the traffic monitoring apparatus includes the first register, update the value of the first information in the first register to a measured value of the target performance indicator of the first packet, and increase the value of the second information in the first register by 1.

In an embodiment, the apparatus further includes a second receiving unit, a third determining unit, and a first updating unit. The second receiving unit is configured to receive a second packet. The third determining unit is configured to determine whether the traffic monitoring apparatus includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the traffic monitoring apparatus and that match a value of the first information in the second register. The first updating unit is configured to: in response to determining, by the traffic monitoring apparatus, that the traffic monitoring apparatus does not include the second register, update, according to a value of the first information in a third register included in the traffic monitoring apparatus and a value of the second information in the third register, a value of the first information in a fourth register included in the traffic monitoring apparatus and a value of the second information in the fourth register, where an updated value of the second information in the fourth register is equal to a sum of the value of the second information in the third register and the value of the second information in the fourth register; and clear the value of the second information in the third register.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the traffic monitoring apparatus. Alternatively, the third register is adjacent to the fourth register, and a weighted sum of the value of the second information in the third register and the value of the second information in the fourth register is not greater than a weighted sum of values of the second information in any two adjacent registers included in the traffic monitoring apparatus.

In an embodiment, the apparatus further includes a fourth determining unit and a second updating unit. The fourth determining unit is configured to determine that a measured value of the target performance indicator of the second packet matches an updated value of the first information in the fourth register. The second updating unit is configured to increase the value of the second information in the fourth register by 1.

In an example, the fourth determining unit is configured to determine that the measured value of the target performance indicator of the second packet falls within a value range corresponding to the value of the first information in the fourth register.

In another example, the fourth determining unit is configured to determine that a difference between the measured value of the target performance indicator of the second packet and the value of the first information in the fourth register is less than a difference between the measured value of the target performance indicator of the second packet and a value of the first information in another register.

In an embodiment, the apparatus further includes a fifth determining unit and a third updating unit. The fifth determining unit is configured to determine that a measured value of the target performance indicator of the second packet does not match an updated value of the first information in the fourth register. The third updating unit is configured to: update the value of the first information in the third register to the measured value of the target performance indicator of the second packet, and increase the value of the second information in the third register by 1.

In an embodiment, the apparatus further includes a third receiving unit, a sixth determining unit, and a fourth updating unit. The third receiving unit is configured to receive a third packet. The sixth determining unit is configured to determine that a measured value of the target performance indicator of the third packet matches the value of the first information in the third register. The fourth updating unit is configured to increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the traffic monitoring apparatus are arranged in ascending order of values of the first information in the registers. Alternatively, the registers in the traffic monitoring apparatus are arranged in descending order of values of the first information in the registers.

In this embodiment of this application, the target performance indicator includes any one of the following indicators: a latency, a packet length, a packet receiving time interval, or queue usage.

In this embodiment of this application, the traffic monitoring apparatus is included in a processing chip, for example, may be integrated into an NP chip.

It can be noted that the traffic monitoring apparatus provided in the second aspect corresponds to the method provided in the first aspect. For a specific implementation and an effect achieved, refer to related descriptions of the method shown in the first aspect.

According to a third aspect, an embodiment of this application further provides a traffic monitoring apparatus. The apparatus includes a processor and a transceiver. The transceiver is configured to receive a first packet. The processor is configured to determine whether the traffic monitoring apparatus includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the traffic monitoring apparatus and that match a value of the first information in the first register. The processor is further configured to: in response to determining that the traffic monitoring apparatus includes the first register, update the value of the first information in the first register to a measured value of the target performance indicator of the first packet, and increase the value of the second information in the first register by 1.

In an embodiment, the transceiver is further configured to receive a second packet. The processor is further configured to determine whether the traffic monitoring apparatus includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the traffic monitoring apparatus and that match a value of the first information in the second register. The processor is further configured to: in response to determining, by the traffic monitoring apparatus, that the traffic monitoring apparatus does not include the second register, update, according to a value of the first information in a third register included in the traffic monitoring apparatus and a value of the second information in the third register, a value of the first information in a fourth register included in the traffic monitoring apparatus and a value of the second information in the fourth register, where an updated value of the second information in the fourth register is equal to a sum of the value of the second information in the third register and the value of the second information in the fourth register; and clear the value of the second information in the third register.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the traffic monitoring apparatus. Alternatively, the third register is adjacent to the fourth register, and a weighted sum of the value of the second information in the third register and the value of the second information in the fourth register is not greater than a weighted sum of values of the second information in any two adjacent registers included in the traffic monitoring apparatus.

In an embodiment, the processor is further configured to: determine that a measured value of the target performance indicator of the second packet matches an updated value of the first information in the fourth register, and increase the value of the second information in the fourth register by 1. The processor is configured to determine that the measured value of the target performance indicator of the second packet falls within a value range corresponding to the value of the first information in the fourth register. Alternatively, the processor is configured to determine that a difference between the measured value of the target performance indicator of the second packet and the value of the first information in the fourth register is less than a difference between the measured value of the target performance indicator of the second packet and a value of the first information in another register.

In an embodiment, the processor is further configured to: determine that a measured value of the target performance indicator of the second packet does not match an updated value of the first information in the fourth register, update the value of the first information in the third register to the measured value of the target performance indicator of the second packet, and increase the value of the second information in the third register by 1.

In an embodiment, the transceiver is further configured to receive a third packet. The processor is further configured to: determine that a measured value of the target performance indicator of the third packet matches the value of the first information in the third register, and increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the traffic monitoring apparatus are arranged in ascending order of values of the first information in the registers. Alternatively, the registers in the traffic monitoring apparatus are arranged in descending order of values of the first information in the registers.

In this embodiment of this application, the target performance indicator includes any one of the following indicators: a latency, a packet length, a packet receiving time interval, or queue usage.

In this embodiment of this application, the traffic monitoring apparatus is included in a processing chip, for example, may be integrated into an NP chip.

It can be noted that the traffic monitoring apparatus provided in the third aspect corresponds to the method provided in the first aspect. For a specific implementation and an effect achieved, refer to related descriptions of the method shown in the first aspect.

According to a fourth aspect, an embodiment of this application further provides an integrated circuit. The integrated circuit includes a control circuit and an interface circuit. The interface circuit is configured to receive a first packet. The control circuit is configured to determine whether the integrated circuit includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the integrated circuit and that match a value of the first information in the first register. The control circuit is further configured to: in response to determining that the integrated circuit includes the first register, update the value of the first information in the first register to a measured value of the target performance indicator of the first packet, and increase the value of the second information in the first register by 1.

In an embodiment, the interface circuit is further configured to receive a second packet. The control circuit is further configured to determine whether the integrated circuit includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the integrated circuit and that match a value of the first information in the second register. The control circuit is further configured to: in response to determining, by the integrated circuit, that the integrated circuit does not include the second register, update, according to a value of the first information in a third register included in the integrated circuit and a value of the second information in the third register, a value of the first information in a fourth register included in the integrated circuit and a value of the second information in the fourth register, where an updated value of the second information in the fourth register is equal to a sum of the value of the second information in the third register and the value of the second information in the fourth register; and clear the value of the second information in the third register.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the integrated circuit. Alternatively, the third register is adjacent to the fourth register, and a weighted sum of the value of the second information in the third register and the value of the second information in the fourth register is not greater than a weighted sum of values of the second information in any two adjacent registers included in a traffic monitoring apparatus.

In an embodiment, the control circuit is further configured to: determine that a measured value of the target performance indicator of the second packet matches an updated value of the first information in the fourth register, and increase the value of the second information in the fourth register by 1. The control circuit is configured to determine that the measured value of the target performance indicator of the second packet falls within a value range corresponding to the value of the first information in the fourth register. Alternatively, the control circuit is configured to determine that a difference between the measured value of the target performance indicator of the second packet and the value of the first information in the fourth register is less than a difference between the measured value of the target performance indicator of the second packet and a value of the first information in another register.

In an embodiment, the control circuit is further configured to: determine that a measured value of the target performance indicator of the second packet does not match an updated value of the first information in the fourth register, update the value of the first information in the third register to the measured value of the target performance indicator of the second packet, and increase the value of the second information in the third register by 1.

In an embodiment, the transceiver is further configured to receive a third packet. The control circuit is further configured to: determine that a measured value of the target performance indicator of the third packet matches the value of the first information in the third register, and increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the integrated circuit are arranged in ascending order of values of the first information in the registers. Alternatively, the registers in the integrated circuit are arranged in descending order of values of the first information in the registers.

In this embodiment of this application, the target performance indicator includes any one of the following indicators: a latency, a packet length, a packet receiving time interval, or queue usage.

In this embodiment of this application, the integrated circuit is included in a processing chip, for example, may be integrated into an NP chip.

It can be noted that the integrated circuit provided in the fourth aspect corresponds to the method provided in the first aspect. For a specific implementation and an effect achieved, refer to related descriptions of the method shown in the first aspect.

According to a fifth aspect, an embodiment of this application further provides a network device. The network device may include the traffic monitoring apparatus provided in the second aspect or the third aspect, or may include the integrated circuit provided in the fourth aspect.

According to a sixth aspect, an embodiment of this application further provides a computer-readable storage medium, including instructions. When the instructions are run on a computer, the computer is enabled to perform the method provided in the first aspect.

According to a seventh aspect, this application further provides a computer program product, including a computer program or computer-readable instructions. When the computer program or the computer-readable instructions are run on a computer, the computer is enabled to perform the method provided in the first aspect.

BRIEF DESCRIPTION OF DRAWINGS

FIG. 4a-1 to FIG. 4a-3 are a schematic diagram of content stored in each register in the traffic monitoring method shown in FIG. 3 according to this embodiment of this application;

FIG. 4b-1 to FIG. 4b-3 are another schematic diagram of content stored in each register in the traffic monitoring method shown in FIG. 3 according to this embodiment of this application;

DESCRIPTION OF EMBODIMENTS

Figure 1:
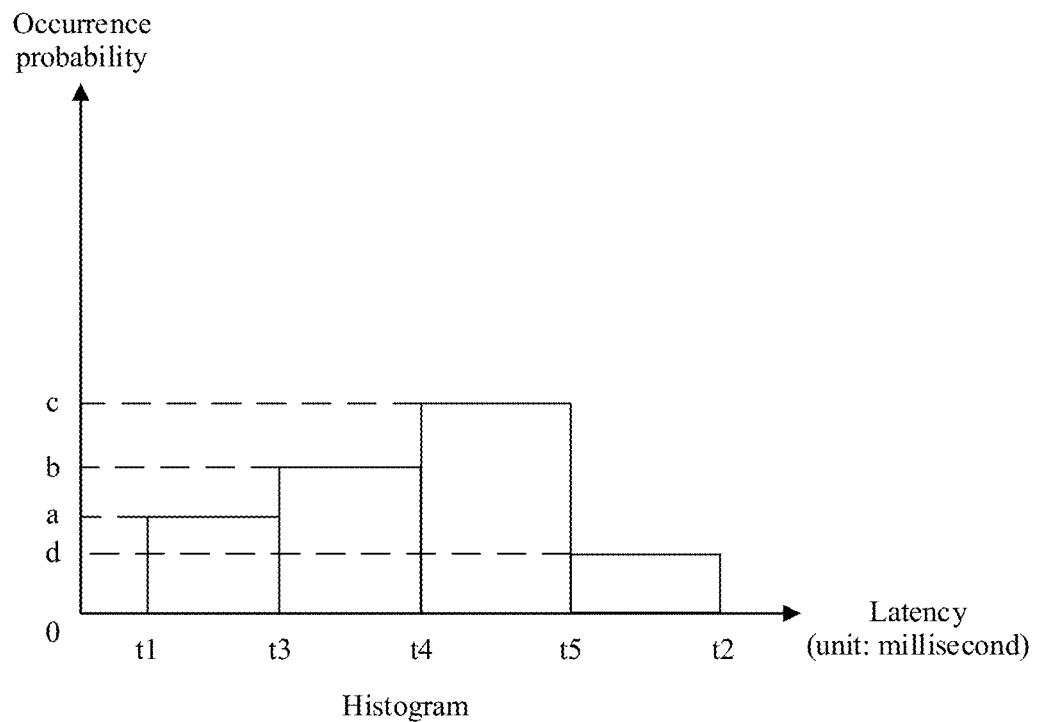
FIG. 1 is a schematic diagram of a histogram of a latency in a histogram statistics algorithm according to an embodiment of this application.

To reduce storage resources for obtaining distribution information of various performance indicators such as a storage latency, a packet length, a packet receiving time interval, and queue usage, statuses of the performance indicators are usually recorded through histogram statistics, to reflect a network operating status.

Currently, in an example, statistics on a performance indicator of a network device may be collected by using four registers R1 to R4 on the network device. For example, the performance indicator on which the statistics are collected is a latency. It is assumed that a preset target quantile value (namely, a reference proportion for adjusting a latency threshold) is 95%; R1 is configured to store a total quantity n of packets collected in a current periodicity, where each time the network device receives one packet, a value in R1 is increased by 1; R2 is configured to store a latency threshold t1 in the periodicity; R3 is configured to store a quantity m of packets, in the packets received in the periodicity, whose latencies exceed the latency threshold t1; and R4 is configured to store a maximum latency (ML for short) in the packets currently received in the periodicity. During specific implementation, the network device periodically calculates m/n (namely, a proportion of the packets whose latencies are greater than t1 in all the packets), and updates a value in R2 based on m/n and the target quantile value. When (1−m/n)<95%, a new latency threshold t2 is calculated according to the following formula (1); or when (1−m/n)≥95%, a new latency threshold t3 is calculated according to the following formula (2):

$$t2=t1-ML*[95\%-(1-m/n)]/G \quad \text{Formula (1)}$$

$$t3=t1+ML*[(1-m/n)-95\%]/G \quad \text{Formula (2)}$$

G is an operation, and is a constant. It can be noted that each time the value in R2 is updated, values in the other registers need to be cleared. This statistical solution is easy to implement, but has many problems: Problem 1: Because data distribution is not considered, only linear gradient descent can be used to converge the threshold t1, which easily causes a convergence problem and affects statistical precision. Problem 2: In this solution, only the preset target quantile value can be obtained, and information about other quantile values cannot be obtained. Problem 3: A statistical result reflects a real-time value, which may be greatly different from a status of the performance indicator in an entire operating process of the network device.

In another example, currently, statistics on a performance indicator may be collected by using a histogram statistics algorithm. The statistics on the performance indicator are collected by using R1 to R4. For example, each of R1 to R4 includes one data bucket for latency statistics collection. This example is described by using a specific implementation of the data bucket, namely, a bin, in a histogram statistics method as an example. For example, R1 includes a bin 1 for the latency statistics collection, R2 includes a bin 2 for the latency statistics collection, R3 includes a bin 3 for the latency statistics collection, and R4 includes a bin 4 for the latency statistics collection. In this case, the bin 1 to the bin 4 are a group of bins for the latency statistics collection. A network device pre-configures a latency statistics range: [t1, t2]. The bin 1 to the bin 4 each include a counter, and each counter is for counting a quantity of packets, in received packets, that fall within a latency sub-range corresponding to the bin to which the counter belongs. For example, [t1, t2] is equally divided into four subintervals: [t1, t3], (t3, t4], (t4, t5], and (t5, t2], where t3=t1+(t2−t1)/4, t4=t3+(t2−t1)/4, and t5=t4+(t2−t1)/4. A counter 1 in the bin 1 is for counting a quantity of packets whose latencies fall within [t1, t3] in the received packets, a counter 2 in the bin 2 is for counting a quantity of packets whose latencies fall within (t3, t4] in the received packets, a counter 3 in the bin 3 is for counting a quantity of packets whose latencies fall within (t4, t5] in the received packets, and a counter 4 in the bin 4 is for counting a quantity of packets whose latencies fall within (t5, t2] in the received packets. Any latency sub-range may be denoted as a depth of the bin. For example, the latency sub-range (t3, t4] may be referred to as a depth of the bin 2. A probability distribution curve of a latency of the network device may be obtained at any moment based on values of the counters in the bin 1 to the bin 4. For example, a process may be: The values of the counters are normalized to obtain normalizing results of the counter 1 to the counter 4, namely, a, b, c, and d in sequence. In this case, a histogram shown in FIG. 1 may be obtained, where histogram heights corresponding to the bin 1 to the bin 4 are respectively a, b, c, and d. In addition, a cumulative distribution function (CDF for short) curve of the latency may be obtained based on the histogram, and a corresponding value of a horizontal coordinate may be further determined based on a required occurrence probability (for example, 95%), and is used as a latency calibration value that is set by the network device. Compared with the foregoing statistical method, the current histogram statistics algorithm can be for accurately collecting the statistics on the performance indicator of the network device. However, in this histogram statistics solution, the value range corresponding to the performance indicator needs to be pre-configured and equally divided into the corresponding bins. A configuration process is complex. Due to diversity and complexity of packets, the configured value range and division into the depths of the bins may be inappropriate. A value of a counter in a part of bins is large, and a value of a counter in another part of bins is small, causing an inaccurate statistical result.

Based on this, embodiments of this application provide a traffic monitoring method. The traffic monitoring method is applied to a traffic monitoring apparatus provided in embodiments of this application. The traffic monitoring apparatus includes a plurality of registers, and each register includes first information and second information. The first information indicates a depth of a data bucket that carries a measured value of a target performance indicator of a to-be-monitored packet, and the second information indicates a quantity of packets that are in packets received by the traffic monitoring apparatus and that match a value of the first information in the register. Each register corresponds to one data bucket. The data bucket collects statistics on a packet whose measured value of the target performance indicator falls within a specific range. A value of the first information and a value of the second information are recorded in the data bucket. The value of the first information refers to the measured value or a range of the measured value of the packet on which the statistics are collected in the data bucket, and the value of the second information refers to a quantity of packets on which the statistics are collected in the data bucket. A statistical result recorded in the data bucket is stored in the corresponding register. A depth of a data bucket corresponding to a register may be used as a value of the first information in the register, and a quantity of packets falling within a corresponding range of the depth of the corresponding data bucket may be used as a value of the second information in the register corresponding to the data bucket. For example, a register Rx corresponds to a data bucket x, and a depth of the data bucket x is 0 to 50. In this case, when the traffic monitoring apparatus does not receive a packet whose measured value of the target performance indicator falls within 0 to 50, both a value of the first information and a value of the second information in the register Rx are 0. When the traffic monitoring apparatus receives a packet 1 whose measured value of the target performance indicator is 10, in the register Rx, the value of the first information may be 10, and the value of the second information may be 1. When the traffic monitoring apparatus receives a packet 2 whose measured value of the target performance indicator is 16, in the register Rx, the value of the first information may be $[(10*1+16*1)/(1+1)]=13$, and the value of the second information may be 2. When the traffic monitoring apparatus receives a packet 3 whose measured value of the target performance indicator is 7, in the register Rx, the value of the first information may be $[(13*2+7*1)/(2+1)]=11$, and the value of the second information may be 3.

For example, the traffic monitoring method provided in embodiments of this application may include: When the traffic monitoring apparatus receives a first packet, and determines that the traffic monitoring apparatus further includes an empty first register (that is, a value of the second information in the first register is 0), the traffic monitoring apparatus collects statistics on the target performance indicator of the first packet by using the first register, to be specific, updates a value of the first information in the first register to a measured value of the target performance indicator of the first packet, and increases the value of the second information in the first register by 1. In this way, a value range of a to-be-monitored performance indicator (namely, the target performance indicator) does not need to be configured, and the value range does not need to be equally divided to determine a depth of each data bucket either. Instead, the first information indicating a depth of a data bucket that carries a measured value of the target performance indicator of a to-be-monitored packet, and the second information indicating a quantity of packets that are in received packets and that match a value of the first information in each register are used as two statistical parameters of the register, to flexibly update values of the two statistical parameters in each register according to the measured value of the target performance indicator of the received packet, so that statistics on the target performance indicator are collected. This not only reduces configuration workload for collecting the statistics on the target performance indicator, but also makes it possible to obtain a more comprehensive and accurate statistical result because an entire statistical value range and a statistical value sub-range of each register are not limited. Therefore, an actual operating status of the network device can be learned more accurately. It can be noted that, in this implementation, a larger quantity of registers used for statistics collection in the traffic monitoring apparatus indicates a more accurate statistical result.

A data bucket represents an object for collecting statistics on the measured value of the target performance indicator, a depth of the data bucket refers to a measured value or a range of a measured value that is of the target performance indicator and on which statistics can be collected in the data bucket, and data buckets with different depths are for collecting statistics on packets with different measured values or different measured value ranges of the target performance indicator. For example, the traffic monitoring apparatus includes a data bucket 1 and a data bucket 2. The data bucket 1 is for collecting statistics on a packet whose measured value of the target performance indicator falls within 0 to 50, and the data bucket 2 is for collecting statistics on a packet whose measured value of the target performance indicator falls within 51 to 100. In this case, a depth of the data bucket 1 may be represented as 0 to 50, and a depth of the data bucket 2 may be represented as 51 to 100. Alternatively, if the depth of the data bucket is a smallest value of the measured value that is of the target performance indicator and that is carried in the data bucket, and the data bucket carries a packet whose measured value falls within the depth of the data bucket to the depth of the data bucket plus 50, the depth of the data bucket 1 may be represented as 0, and a depth of the data bucket 2 may be represented as 51. Alternatively, the depth of the data bucket may be represented as an average value of measured values of packets that fall within a statistical range of the data bucket.

The register is a hardware implementation of the data bucket in the traffic monitoring apparatus. For example, data on which statistics are collected in the data bucket 1 may be stored in a register 1 of the traffic monitoring apparatus, and data on which statistics are collected in the data bucket 2 may be stored in a register 2 of the traffic monitoring apparatus. It is assumed that the traffic monitoring apparatus receives a packet 1 to a packet 5, and measured values of the target performance indicator of the packet 1 to the packet 5 are respectively 10, 20, 60, 30, and 90. In this case, the packet 1, the packet 2, and the packet 4 correspond to the depth of the data bucket 1 (in other words, fall within a statistical range of the data bucket 1), and the register 1 stores statistical results corresponding to the packet 1, the packet 2, and the packet 4; and the packet 3 and the packet 5 correspond to the depth of the data bucket 2, and the register 2 stores statistical results corresponding to the packet 3 and the packet 5. For example, a value of the first information stored in the register 1 corresponding to the data bucket 1 may be $[(10*1+20*1+30*1)/(1+1+1)]=20$, and a value of the second information stored in the register 1 is 3; and a value of the first information stored in the register 2 corresponding to the data bucket 2 may be $[(60*1+90*1)/(1+1)]=75$, and a value of the second information stored in the register 2 is 2.

In an example, in the histogram statistics method, the data bucket may be implemented, for example, by using a bin. Each register stores a statistical result corresponding to one bin, and the statistical result collected by the bin is stored in the corresponding register. In the following descriptions, the data bucket, the bin, and the register may be used interchangeably.

The first information in the register may be represented as value, and the second information in the register may be represented as counter. In the following descriptions, the first information and value may be used interchangeably, and the second information and counter may be used interchangeably.

Figure 2:
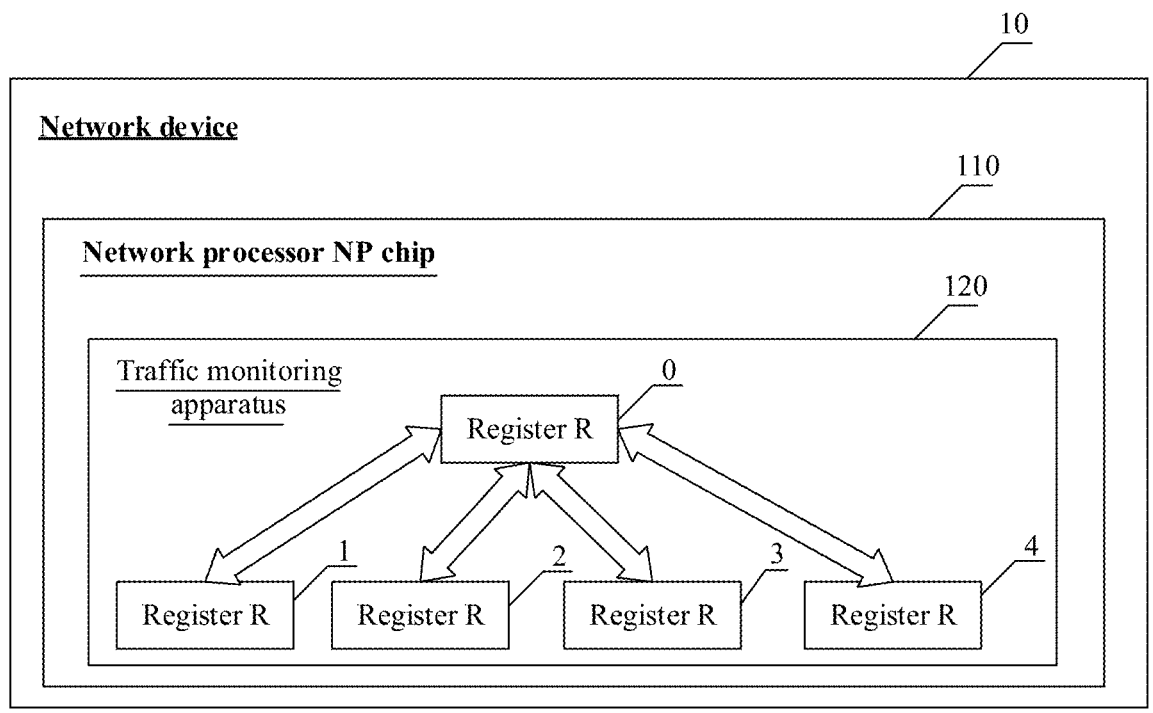
FIG. 2 is a schematic diagram of a structure of a network device 10 according to an embodiment of this application.

For example, for details about a network device 10 used in embodiments of this application, refer to FIG. 2. As shown in FIG. 2, the network device 10 may include at least a traffic monitoring apparatus 120. The traffic monitoring apparatus 120 may include a plurality of registers R. For example, the traffic monitoring apparatus 120 includes R1 to R4. According to the traffic monitoring method provided in embodiments of this application, the traffic monitoring apparatus 120 can manage, control, and process content stored in R1 to R4. The traffic monitoring apparatus 120 may be integrated into a processing chip, for example, may be integrated into a network processor (NP for short) chip 110. The traffic monitoring apparatus 120 may be a functional module that is in the NP chip 110 and that has a traffic monitoring capability provided in embodiments of this application. For example, the traffic monitoring apparatus 120 is a coprocessor that has the traffic monitoring capability in the NP chip 110.

It can be noted that, in this example, the registers for storing the statistical results are R1 to R4, and the traffic monitoring apparatus 120 may further include a register R0, where R0 is configured to store a value of the first information and a value of the second information of a packet on which statistics are to be collected, and the value of the second information in R0 is 1. If statistics on a packet are collected, a value of the first information and a value of the second information of the packet in R0 may be cleared to prepare for collecting statistics on a next packet. Alternatively, when a next packet on which statistics are to be collected is received, the value of the first information of the current packet in R0 may be directly updated by using a value of the first information of the next packet.

Figure 3:
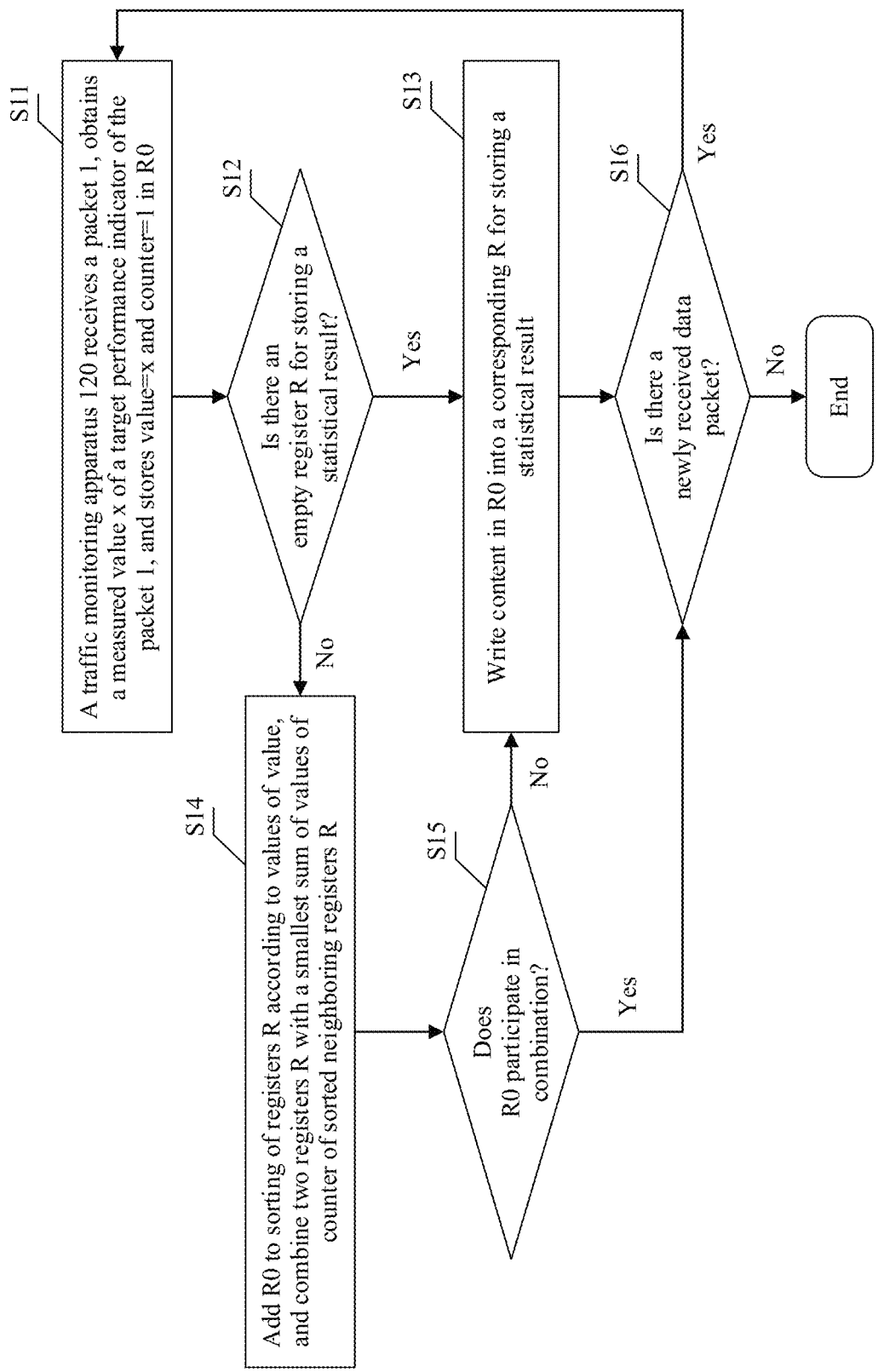
FIG. 3 is a schematic flowchart of an example of a traffic monitoring method according to an embodiment of this application.

The network device 10 shown in FIG. 2 is used as an example to describe a procedure for the traffic monitoring method provided in embodiments of this application. Refer to FIG. 3. A traffic monitoring process may include: S11: The traffic monitoring apparatus 120 receives a packet 1, obtains a measured value x of a target performance indicator of the packet 1, and stores value=x and counter=1 in R0. S12: Determine whether there is an empty R for storing a statistical result. If yes, perform S13; otherwise, perform S14. S13: Write content in R0 into a corresponding R for storing a statistical result, and perform S16. It can be noted that values of value in correspondences stored in registers R may be sorted in descending or ascending order. S14: Add R0 to sorting of the registers R according to the values of value, and combine two registers R with a smallest sum of values of counter of sorted neighboring registers R. S15: Determine whether R0 participates in combination. If yes, perform S16; otherwise, perform S13. S16: Determine whether a new packet is received. If yes, return to S11; otherwise, end the process.

In S11, that the traffic monitoring apparatus 120 receives a packet 1, and obtains a measured value x of a target performance indicator of the packet 1 may be specifically: The network device 10 receives the packet 1, the NP chip 110 extracts a packet header (or extracts a part of data in a payload (English: payload) and a packet header) from the packet 1, and the traffic monitoring apparatus 120 in the NP chip 110 performs traffic monitoring based on the extracted part, and obtains the measured value x of the target performance indicator of the packet 1.

In an example, a process in which the traffic monitoring apparatus 120 performs packet-by-packet latency statistics collection when receiving 12 packets is described according to the method shown in FIG. 3. For example, a latency may be measured in milliseconds in the following descriptions. An example in which values of value in registers R configured to store statistical results are sorted in ascending order is used for description.

Figures 1, 4A:
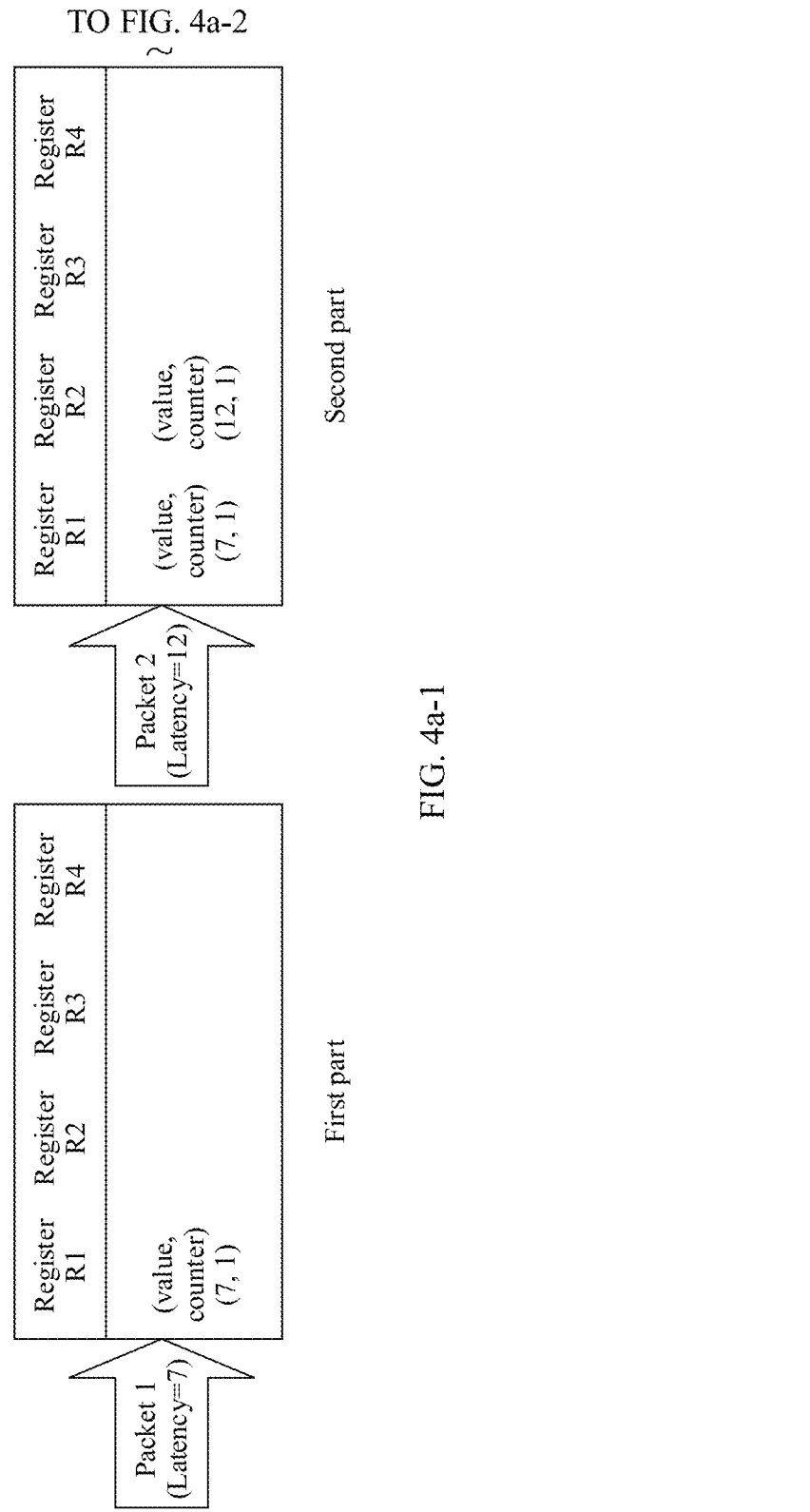
Figures 2, 4A:
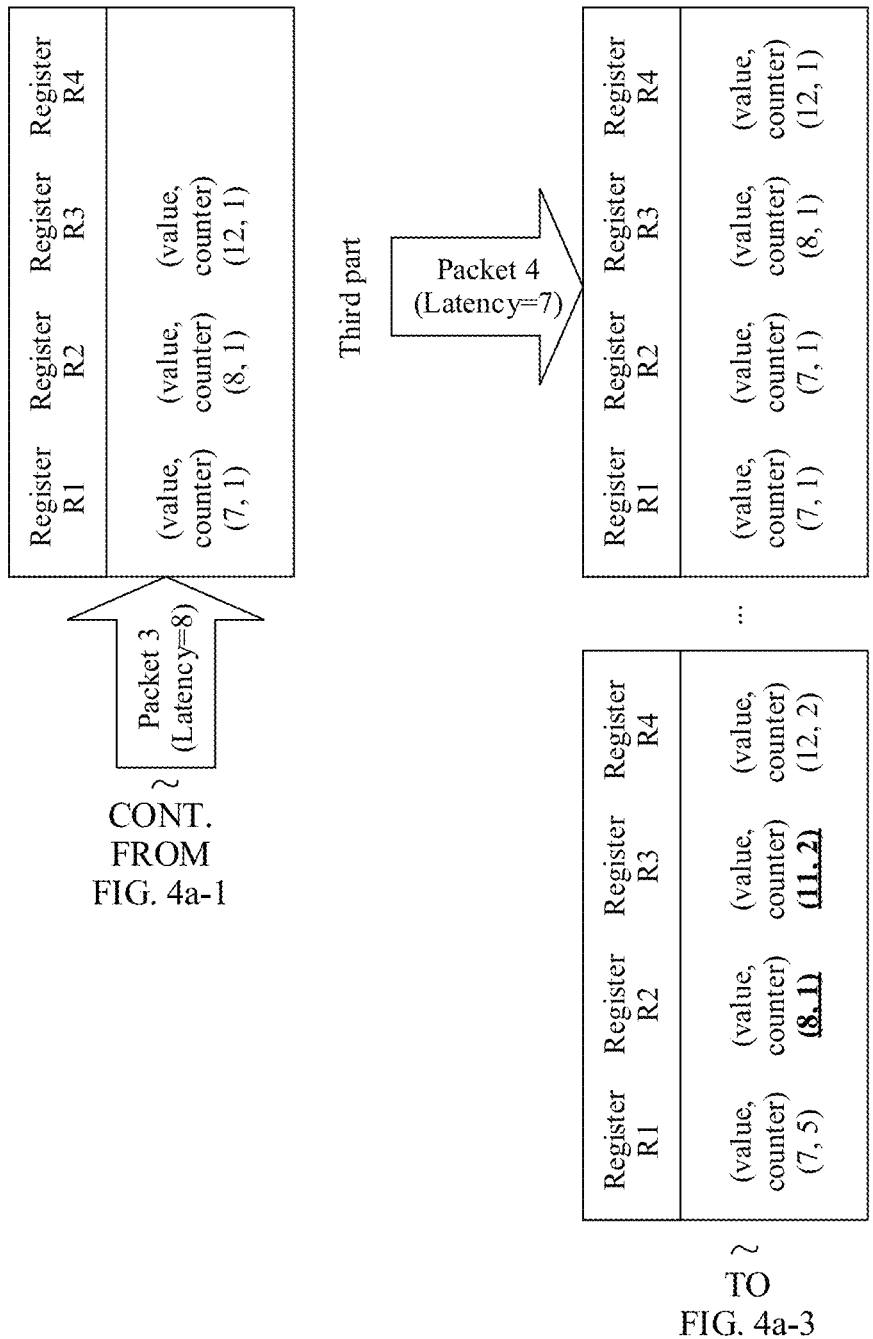

In a case, when the network device 10 receives a packet 1, the traffic monitoring apparatus 120 obtains a measured value of the latency of the packet 1 as 7, stores value=7 and counter=1 in R0, and stores value=7 and counter=1 that are in R0 in R1, as shown in the first part in FIG. 4a-1. When the network device 10 receives a packet 2, the traffic monitoring apparatus 120 obtains a measured value of the latency of the packet 2 as 12, and stores value=12 and counter=1 in R0. Because 12 is greater than 7, value=12 and counter=1 in R0 are stored in R2, as shown in the second part in FIG. 4a-1. When the network device 10 receives a packet 3, the traffic monitoring apparatus 120 obtains a measured value of the latency of the packet 3 as 8, and stores value=8 and counter=1 in R0. Because 8 is greater than 7 and less than 12, value=12 and counter=1 in R2 are migrated to R3, and value=8 and counter=1 in R0 are stored in R2, as shown in the third part in FIG. 4a-2. When the network device 10 receives a packet 4, the traffic monitoring apparatus 120 obtains a measured value of the latency of the packet 4 as 7, and stores value=7 and counter=1 in R0. Because 7 is less than 8 but not less than 7, value=12 and counter=1 in R3 are migrated to R4, value=8 and counter=1 in R2 are migrated to R3, and value=7 and counter=1 in R0 are stored in R2, as shown in the fourth part in FIG. 4a-2. The rest can be deduced by analogy. After 10 packets are received, for content stored in R1 to R4, refer to the fifth part in FIG. 4a-2. When the network device 10 receives a packet 11, the traffic monitoring apparatus 120 obtains a measured value of the latency of the packet 11 as 7, and stores value=7 and counter=1 in R0. In this case, because there is no empty R, R0 and R1 to R4 are sorted in ascending order of values of value, which are respectively R0 (value=7, counter=1), R1 (value=7, counter=5), R2 (value=8, counter=1), R3 (value=11, counter=2), and R4 (value=12, counter=2). In this way, it is determined that R2 and R3 have a smallest sum of values of counter in two adjacent registers R. Content in R2 (value=8, counter=1) and content in R3 (value=11, counter=2) are combined to obtain [value=(8*1+11*2)/(1+2)=10, counter=(1+2)=3], value=8 and counter=1 that are obtained through combination are stored in R3, value=7 and counter=5 in R1 are migrated to R2, and value=7 and counter=1 in R0 are stored in R1. Content stored in R1 to R4 is shown in the sixth part of FIG. 4a-3. When the network device 10 receives a packet 12, the traffic monitoring apparatus 120 obtains a measured value of the latency of the packet 12 as 4, and stores value=4 and counter=1 in R0. In this case, because there is no empty R, R0 and R1 to R4 are sorted in ascending order of values of value, which are respectively R0 (value=4, counter=1), R1 (value=7, counter=1), R2 (value=7, counter=5), R3 (value=10, counter=3), and R4 (value=12, counter=2). In this way, it is determined that R0 and R1 have a smallest sum of values of counter in two adjacent registers R. Content in R0 (value=4, counter=1) and content in R1 (value=7, counter=1) are combined to obtain [value=(4*1+7*1)/(1+1)=5.5, counter=(1+1)=2], and value=5.5 and counter=2 that are obtained through combination are stored in R1. Content stored in R1 to R4 is shown in the seventh part of FIG. 4a-3.

Figures 1, 4B:
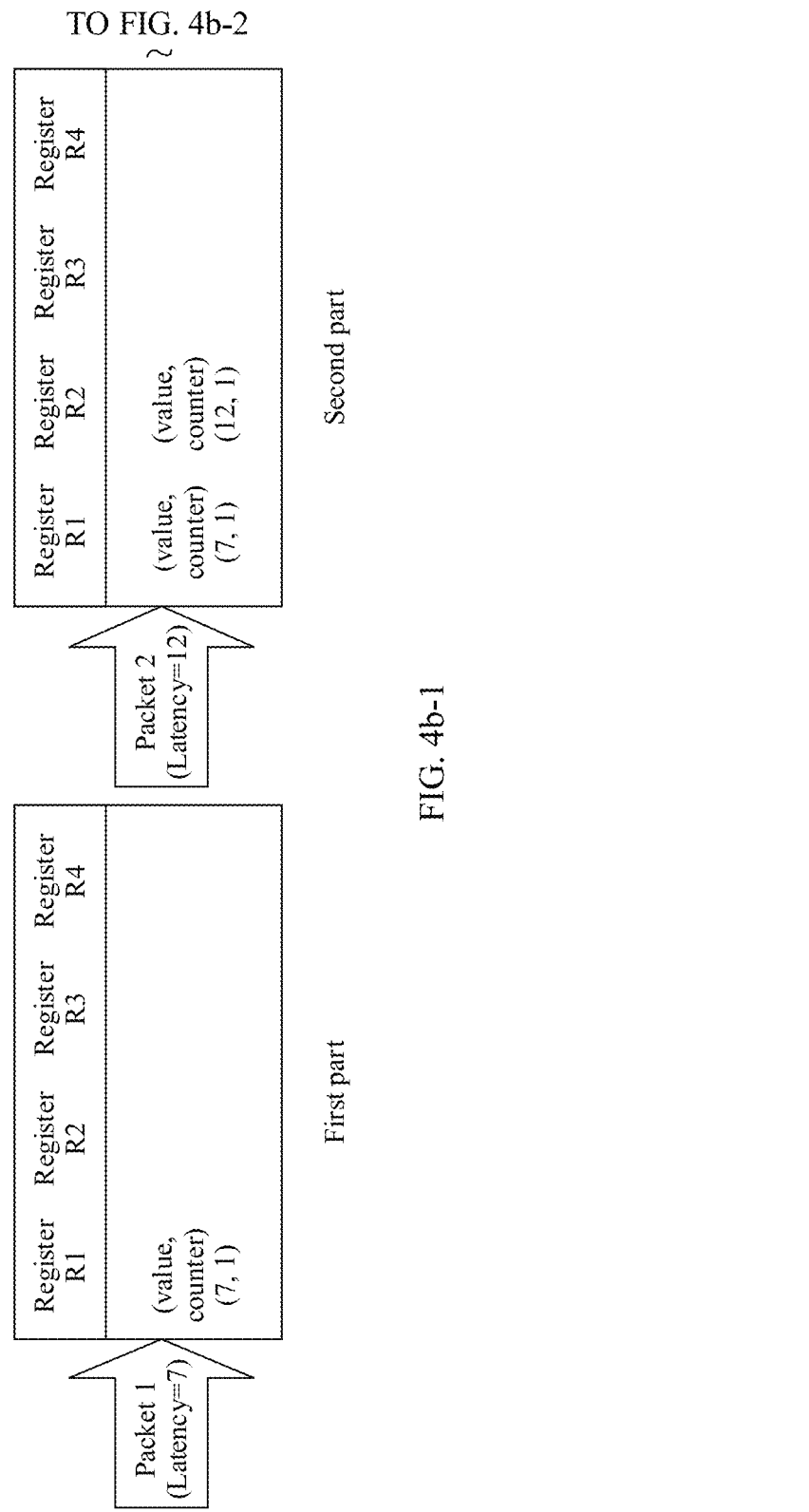

In another case, when the network device 10 receives a packet 1 to a packet 3, for statuses of R1 to R4 of the traffic monitoring apparatus 120, refer to the first part to the third part in FIG. 4b-1 and FIG. 4b-2. The first part to the third part in FIG. 4b-1 and FIG. 4b-2 correspond to the first part to the third part in FIG. 4a-1 and FIG. 4a-2. When the network device 10 receives a packet 4', the traffic monitoring apparatus 120 obtains a measured value of the latency of the packet 4' as 7, and stores value=7 and counter=1 in R0. It is determined that a value of value in R0 and a value of value in R1 are both 7. Therefore, content in R0 and content in R1 are combined. To be specific, a value of counter in R1 is increased by 1, and value=7 and counter=2 are stored in R1, as shown in the fourth part in FIG. 4b-2. The rest can be deduced by analogy. After 10 packets are received, for content stored in R1 to R4, refer to the fifth part in FIG. 4b-2. When the network device 10 receives a packet 11', the traffic monitoring apparatus 120 obtains a measured value of the latency of the packet 11' as 6, and stores value=6 and counter=1 in R0. In this case, because there is no empty R, R0 and R1 to R4 are sorted in ascending order of values of value, which are respectively R0 (value=6, counter=1), R1 (value=7, counter=5), R2 (value=8, counter=1), R3 (value=11, counter=2), and R4 (value=12, counter=2). In this way, it is determined that R2 and R3 have a smallest sum of values of counter in two adjacent registers R. Content in R2 (value=8, counter=1) and content in R3 (value=11, counter=2) are combined to obtain [value=(8*1+11*2)/(1+2)=10, counter=(1+2)=3], value=10 and counter=3 that are obtained through combination are stored in R3, content in R1 is migrated to R2, and content in R0 is stored in R1. Content stored in R1 to R4 is shown in the sixth part of FIG. 4b-3. When the network device 10 receives a packet 12', the traffic monitoring apparatus 120 obtains a measured value of the latency of the packet 12' as 4, and stores value=4 and counter=1 in R0. In this case, because there is no empty R, R0 and R1 to R4 are sorted in ascending order of values of value, which are respectively R0 (value=4, counter=1), R1 (value=6, counter=1), R2 (value=7, counter=5), R3 (value=10, counter=3), and R4 (value=12, counter=2). In this way, it is determined that R0 and R1 have a smallest sum of values of counter in two adjacent registers R. Content in R0 (value=4, counter=1) and content in R1 (value=6, counter=1) are combined to obtain [value=(4*1+6*1)/(1+1)=5, counter=(1+1)=2], and value=5 and counter=2 that are obtained through combination are stored in R1. Content stored in R1 to R4 is shown in the seventh part of FIG. 4b-3.

It can be noted that the network device 10 or another network device that can communicate with the network device 10 may further include a control apparatus. The control apparatus may be, for example, a central processing unit (CPU for short). The control apparatus can read the statistical results stored in R1 to R4, and process the read statistical results. For example, values of counter in the registers R are normalized. A value of value in each R is used as a horizontal coordinate, and a normalizing result of a value of counter is used as a vertical coordinate, to obtain a probability distribution function (PDF for short) curve that is of the latency of the network device 10 and that terminates at a moment at which the statistical results are read. Then, the value of value in each R is used as a horizontal coordinate, and a vertical coordinate corresponding to each horizontal coordinate is an accumulated sum of normalizing results that are of values of counter in all the registers R and that are less than the value of value and corresponding to the horizontal coordinate, to obtain a CDF curve that is of the latency of the network device 10 and that terminates at a moment at which the statistical results are read.

It can be learned that, according to the traffic monitoring method provided in embodiments of this application, specific values of the performance indicator of all packets do not need to be stored, thereby saving storage resources of the network device. In addition, complex configuration is not required, so that statistics can be simply and accurately collected on the performance indicator of the network device packet by packet. Therefore, an actual operating status of the network device can be accurately analyzed based on the statistical result.

In embodiments of this application, the network device is a device that is integrated with a traffic monitoring apparatus provided in embodiments of this application and that can collect statistics on a performance indicator of received packets packet by packet, and may include but is not limited to a switch, a router, a firewall, or the like.

In embodiments of this application, the performance indicator on which statistics are collected by the network device includes but is not limited to a latency, a packet size (which may also be referred to as a packet length), a packet receiving time interval, or queue usage.

With reference to the accompanying drawings, the following uses an embodiment to describe in detail a specific implementation of the traffic monitoring method in embodiments of this application.

An embodiment of this application provides a traffic monitoring method. The method may be applied to a traffic monitoring apparatus, for example, the traffic monitoring apparatus 120 in the network device 10 shown in FIG. 2. The traffic monitoring apparatus collects statistics on different performance indicators by performing a same operation. In this embodiment of this application, an example in which the traffic monitoring apparatus collects statistics on a target performance indicator is used for description. The target performance indicator is any one of all performance indicators that can be monitored by the traffic monitoring apparatus and on which statistics are collected by the traffic monitoring apparatus.

The traffic monitoring apparatus includes one register for temporarily storing a measured value of a target performance indicator of a to-be-monitored packet, and several registers for storing statistical results of the target performance indicator. A quantity of registers for storing the statistical results of the target performance indicator is fixed. After the to-be-monitored packet is received and before the target performance indicator of the to-be-monitored packet is monitored, the register for temporarily storing the measured value of the target performance indicator of the to-be-monitored packet stores a value of first information and a value of second information of the target performance indicator of the to-be-monitored packet, where the value of the second information is 1.

In the following embodiments, the registers for storing the statistical results of the target performance indicator include the first information and the second information. The first information in each register indicates a depth of a data bucket that carries a measured value of the target performance indicator of a to-be-monitored packet. For example, in FIG. 4b-1 to FIG. 4b-3, the first information in each register is represented as value. R1 in the seventh part of FIG. 4*b*-3 is used as an example. R1 includes a data bucket, where a depth of the data bucket corresponds to 5. To be specific, the first information in R1 indicates that the depth of the data bucket that carries a measured value of a latency of the to-be-monitored packet is 5. In other words, R1 monitors a packet whose measured value of the latency corresponds to 5. The second information in each register indicates a quantity of packets that is in packets received by the traffic monitoring apparatus and that match a value of the first information in the register. For example, in FIG. 4*b*-1 to FIG. 4*b*-3, the second information in each register is represented as counter. R1 in the seventh part of FIG. 4*b*-3 is used as an example. A value of the second information in R1 is 2, indicating that there are two packets whose measured values of the latency match 5 in the received packets. In other words, R1 monitors two packets whose measured values of the latency correspond to 5. When the value of the second information in the register is 0, it indicates that the register has not monitored a measured value of the target performance indicator of any packet, that is, the register is empty.

When the traffic monitoring apparatus receives a to-be-monitored packet, the traffic monitoring apparatus needs to first check whether the traffic monitoring apparatus has an empty register configured to store a statistical result of the target performance indicator. If the traffic monitoring apparatus has an empty register configured to store a statistical result of the target performance indicator, the traffic monitoring apparatus may monitor the to-be-monitored packet according to the following method 100 shown in FIG. 5. If the traffic monitoring apparatus does not have an empty register configured to store a statistical result of the target performance indicator, the traffic monitoring apparatus may monitor the to-be-monitored packet according to the following method 200 shown in FIG. 6.

Figure 5:
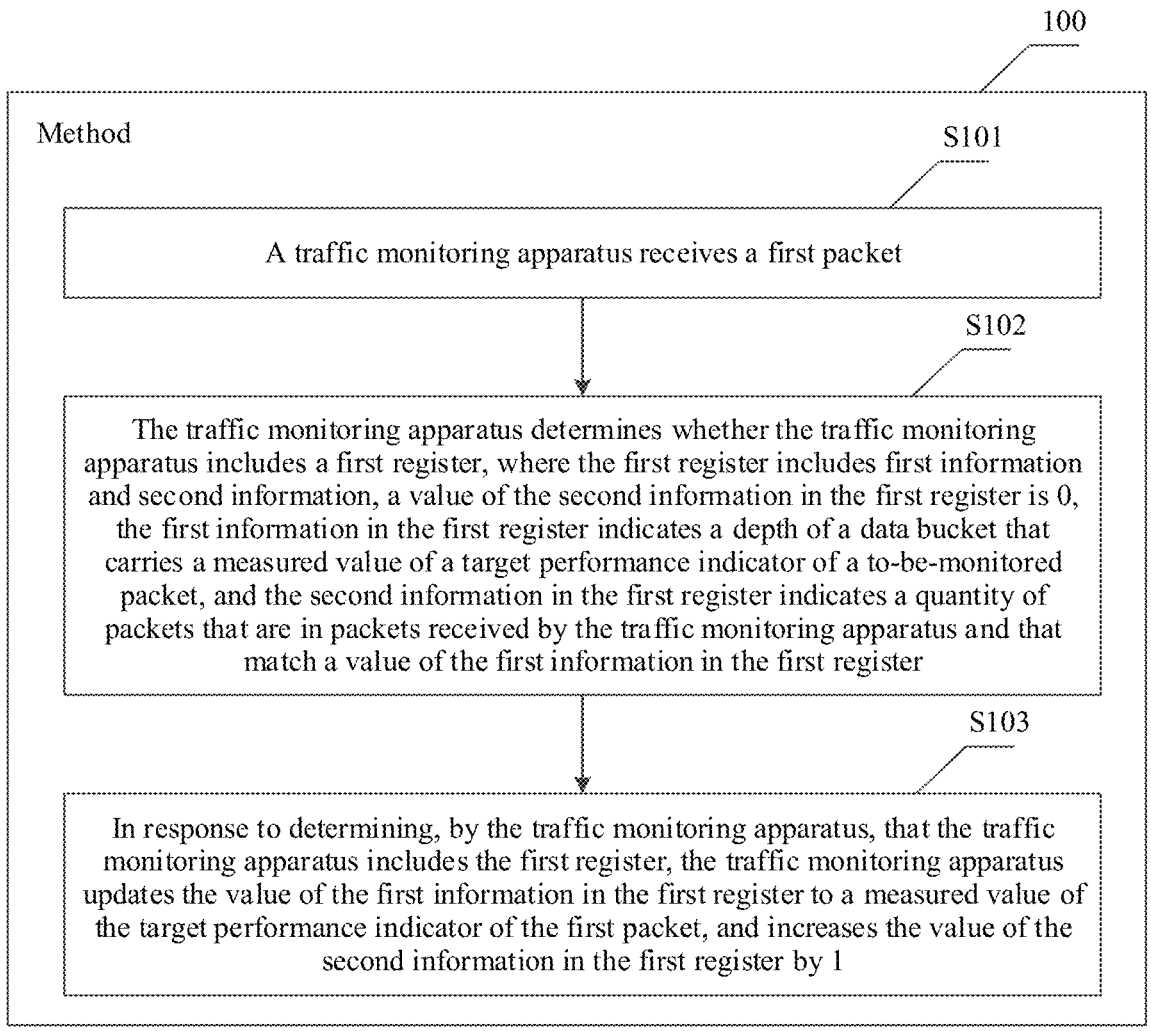
FIG. 5 is a schematic flowchart of a traffic monitoring method 100 according to an embodiment of this application.

In an example, as shown in FIG. 5, a traffic monitoring method 100 provided in an embodiment of this application may include, for example, the following S101 to S103.

S101: A traffic monitoring apparatus receives a first packet.

The first packet may be a service packet or a control packet. This is not limited in this embodiment of this application.

During specific implementation, after a network device that includes the traffic monitoring apparatus receives the first packet, an NP chip in the network device may extract a packet header (or extract a part of data in a payload and a packet header) from the first packet, and then the traffic monitoring apparatus in the NP chip performs traffic monitoring based on the extracted part.

After operation S101 and before operation S102, the traffic monitoring apparatus may obtain a measured value of a target performance indicator of the first packet, and update, according to the measured value, a value of first information and a value of second information in a register for temporarily storing a measured value of the target performance indicator of a to-be-monitored packet, where an updated value of the first information in the register is the measured value of the target performance indicator of the first packet, and an updated value of the second information in the register is 1. This provides a data basis for subsequent monitoring the first packet.

S102: The traffic monitoring apparatus determines whether the traffic monitoring apparatus includes a first register, where the first register includes the first information and the second information, a value of the second information in the first register is 0, the first information in the first register indicates a depth of a data bucket that carries a measured value of the target performance indicator of a to-be-monitored packet, and the second information in the first register indicates a quantity of packets that are in packets received by the traffic monitoring apparatus and that match a value of the first information in the first register.

S103: In response to determining, by the traffic monitoring apparatus, that the traffic monitoring apparatus includes the first register, the traffic monitoring apparatus updates the value of the first information in the first register to the measured value of the target performance indicator of the first packet, and increases the value of the second information in the first register by 1.

After S101, the traffic monitoring apparatus may determine, in all registers for storing statistical results of the target performance indicator, whether there is an empty register. If there is an empty register, the traffic monitoring apparatus records any empty register as the first register, and performs S103. For example, it is assumed that when the traffic monitoring apparatus determines that the traffic monitoring apparatus includes a plurality of empty registers, an empty register adjacent to a non-empty register may be selected as the first register.

FIG. 4*a*-1 to FIG. 4*a*-3 are used as an example. It is assumed that R1 to R4 included in the traffic monitoring apparatus are all empty. When the traffic monitoring apparatus receives a packet 1, any one of registers R1 to R4 may be determined as the first register. For example, R1 is used as the first register. The value of the first information in R1 is updated to a measured value 7 of the target performance indicator (for example, a latency) of the packet 1, and the value of the second information in R1 is updated to 1 (that is, the value 0 of the second information in R1 before updating is increased by 1).

It is assumed that, after the first part in FIG. 4*a*-1 is implemented, the traffic monitoring apparatus receives a packet 2, and may determine any one of the empty registers R2 to R4 as the first register. For example, R2 adjacent to the non-empty register R1 is used as the first register. The value of the first information in R2 is updated to a measured value 12 of the target performance indicator of the packet 2, and the value of the second information in R2 is updated to 1.

In some possible implementations, the registers in the traffic monitoring apparatus may be arranged in ascending order of values of the first information in the registers. To be specific, the traffic monitoring apparatus 120 shown in FIG. 2 is used as an example. If the value of the first information in R1 is a, the value of the first information in R2 is b, the value of the first information in R3 is c, and the value of the first information in R4 is d, where $a \le b \le c \le d$, the four registers may be sequentially sorted as follows: R1, R2, R3, and R4.

In an example, in S102, the register for temporarily storing the measured value of the target performance indicator of the to-be-monitored packet and the non-empty registers for storing the statistical results of the target performance indicator may be sorted according to the values of the first information. The first register may be a register that is configured to store a statistical result of the target performance indicator and that corresponds to a sorting location of the register for temporarily storing the measured value of the target performance indicator of the to-be-monitored packet. In this case, the traffic monitoring apparatus may migrate the statistical result in the register at the sorting location backward, and then perform S103. For example, after the second part in FIG. 4*a*-1 is implemented, the traffic monitoring apparatus receives a packet 3, and may sort the registers R0, R1, and R2 according to the values of value, to obtain a sequence: R1, R0, and R2. In this case, the traffic monitoring apparatus may migrate value=12 and counter=1 that are in R2 to R3, determine R2 as the first register, update the value of the first information in R2 to a measured value 8 of the target performance indicator of the packet 3, and update the value of the second information in R2 to 1. In this way, it can be ensured that after each update, the registers in the traffic monitoring apparatus are still arranged in ascending order of the values of the first information in the registers.

It can be noted that the registers in the traffic monitoring apparatus may alternatively be arranged in descending order of the values of the first information in the registers. For a specific implementation, refer to related descriptions of the foregoing ascending order.

If the traffic monitoring apparatus determines that there is no empty register (in other words, the first register is not included), for a method for monitoring a received packet by the traffic monitoring apparatus, refer to related descriptions in the following method 200. Details are not described herein again.

In this way, according to the method 100, a value range of the to-be-monitored target performance indicator does not need to be configured, and the value range does not need to be equally divided to determine a depth of each data bucket either. Instead, the first information indicating the depth of the data bucket that carries the measured value of the target performance indicator of the to-be-monitored packet, and the second information indicating the quantity of packets that are in the received packets and that match the value of the first information in each register are used as two statistical parameters of the register, to flexibly update values of the two statistical parameters in each register according to the measured value of the target performance indicator of the received packet, so that statistics on the target performance indicator are collected when it is determined that there is an empty register. This not only reduces configuration workload for collecting the statistics on the target performance indicator, but also makes it possible to obtain a more comprehensive and accurate statistical result because an entire statistical value range and a statistical value sub-range of each register are not limited. Therefore, an actual operating status of the network device can be learned more accurately.

Figure 6:
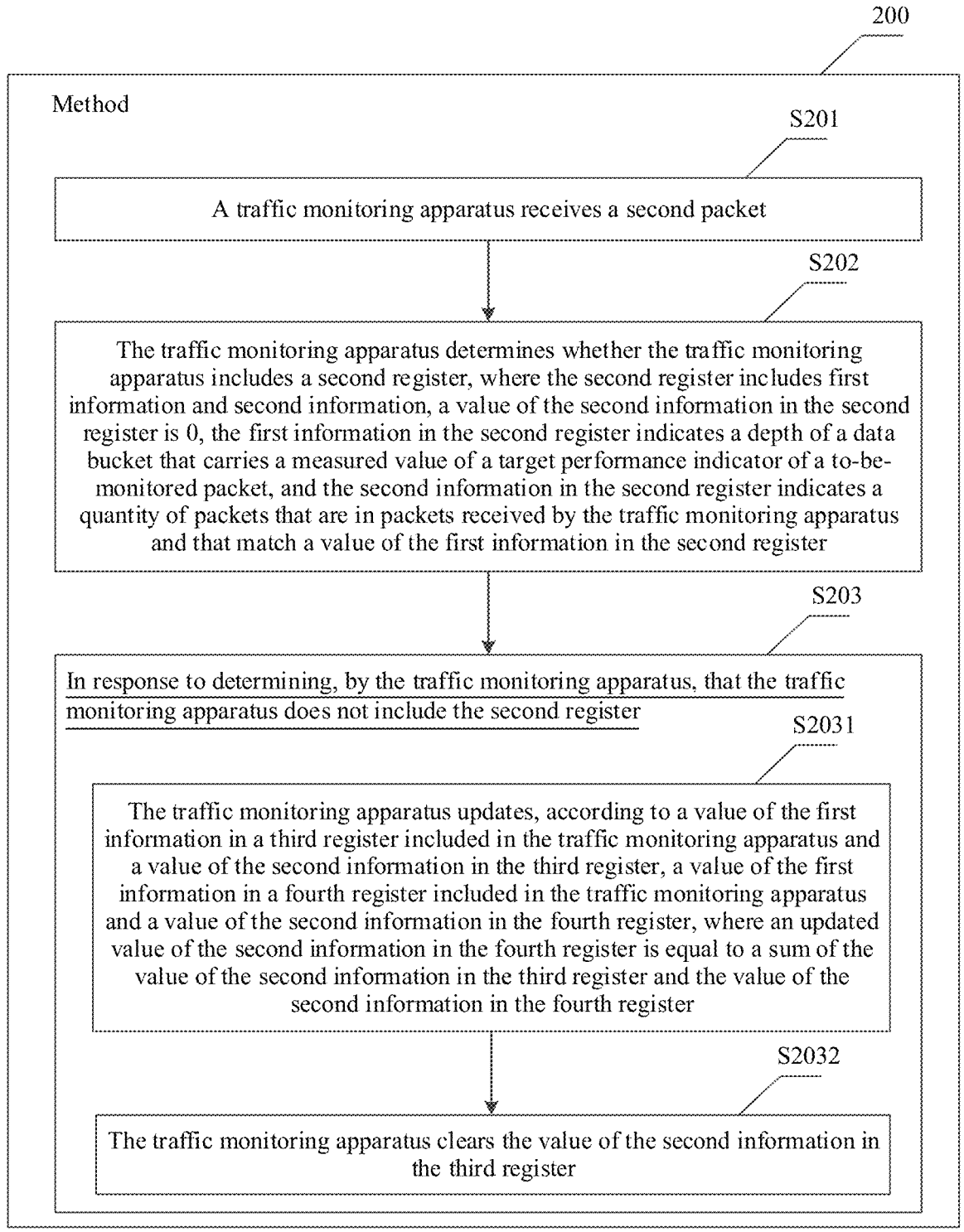
FIG. 6 is a schematic flowchart of a traffic monitoring method 200 according to an embodiment of this application.

In an example, as shown in FIG. 6, another traffic monitoring method 200 provided in an embodiment of this application may include, for example, the following S201 to S203.

S201: A traffic monitoring apparatus receives a second packet.

The second packet may be a service packet or a control packet. This is not limited in this embodiment of this application.

During specific implementation, after a network device that includes the traffic monitoring apparatus receives the second packet, an NP chip in the network device may extract a packet header (or extract a part of data in a payload and a packet header) from the second packet, and then the traffic monitoring apparatus in the NP chip performs traffic monitoring based on the extracted part.

After operation S201 and before operation S202, the traffic monitoring apparatus may obtain a measured value of a target performance indicator of the second packet, and update, according to the measured value, a value of first information and a value of second information in a register for temporarily storing a measured value of the target performance indicator of a to-be-monitored packet, where an updated value of the first information in the register is the measured value of the target performance indicator of the second packet, and an updated value of the second information in the register is 1. This provides a data basis for subsequent monitoring the second packet.

S202: The traffic monitoring apparatus determines whether the traffic monitoring apparatus includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in packets received by the traffic monitoring apparatus and that match a value of the first information in the second register.

S203: In response to determining, by the traffic monitoring apparatus, that the traffic monitoring apparatus does not include the second register, the traffic monitoring apparatus performs the following S2031 and S2032.

S2031: The traffic monitoring apparatus updates, according to a value of the first information in a third register included in the traffic monitoring apparatus and a value of the second information in the third register, a value of the first information in a fourth register included in the traffic monitoring apparatus and a value of the second information in the fourth register, where an updated value of the second information in the fourth register is equal to a sum of the value of the second information in the third register and the value of the second information in the fourth register.

S2032: The traffic monitoring apparatus clears the value of the second information in the third register.

After S201, the traffic monitoring apparatus may determine, in all registers for storing statistical results of the target performance indicator, whether there is an empty register. If there is no empty register, the traffic monitoring apparatus may determine that a determining result in S202 is that the traffic monitoring apparatus does not include the second register, and then perform S203.

During specific implementation, when the traffic monitoring apparatus determines, based on the determining result in S202, that the traffic monitoring apparatus does not include the empty second register, the traffic monitoring apparatus further needs to determine the third register and the fourth register, to monitor the target performance indicator of the second packet. For example, in the traffic monitoring apparatus, all the registers for storing the statistical results of the target performance indicator and the register for temporarily storing the measured value of the target performance indicator of the to-be-monitored packet are arranged in ascending order of values of the first information, to determine the to-be-processed third register and the to-be-processed fourth register.

The determined third register and the determined fourth register are two sorted adjacent registers. A manner of determining the third register and the fourth register that are adjacent to each other in this embodiment of this application includes but is not limited to the following four possible implementations.

Implementation 1: For example, the third register and the fourth register may be determined as the to-be-processed registers in S203 based on a condition that the sum of the value of the second information in the third register and the value of the second information in the fourth register is less than a first threshold. A packet 11' received after the fifth part in FIG. 4b-2 is implemented is used as an example. A sequence of sorted registers is R0, R1, R2, R3, and R4. Assuming that the first threshold is 4, only a sum 3 of a value of counter in R2 and a value of counter in R3 is less than the first threshold 4. In addition, R0 is located on the left side of R2 and R3. In this way, it is determined that the third register is R2 and the fourth register is R3.

Implementation 2: For example, the third register and the fourth register may be determined as the to-be-processed registers in S203 based on a condition that the sum of the value of the second information in the third register and the value of the second information in the fourth register is not greater than a sum of values of the second information in any two adjacent registers included in the traffic monitoring apparatus. A packet 11' received after the fifth part in FIG. 4b-2 is implemented is still used as an example. A sequence of sorted registers is R0, R1, R2, R3, and R4. A sum of values of counter of every two adjacent registers R is calculated, and the obtained sums of the values of counter are respectively 6, 6, 3, and 4. It is determined that a smallest sum of the values of counter is 3, which is a sum of the values of counter in R2 and R3. In addition, R0 is located on the left side of R2 and R3. In this way, it is determined that the third register is R2 and the fourth register is R3.

Implementation 3: For example, the third register and the fourth register may be determined as the to-be-processed registers in S203 based on a condition that a weighted sum of the value of the second information in the third register and the value of the second information in the fourth register is less than a first threshold. A packet 11' received after the fifth part in FIG. 4b-2 is implemented is used as an example. A sequence of sorted registers is R0, R1, R2, R3, and R4. It is assumed that the first threshold is 0.5, and weights of R0, R1, R2, R3, and R4 are respectively 0.2, 0.2, 0.2, 0.1, and 0.3. A weighted sum of values of counter of every two adjacent registers R is calculated, and the obtained weighted sums of the values of counter are respectively (1*0.2+5*0.2) =1.2, (5*0.2+1*0.2)=1.2, (1*0.2+2*0.1)=0.4, and (2*0.1+ 2*0.3)=0.8. In this case, only a weighted sum of the values of counter in R2 and R3 is 0.4, which is less than the first threshold 0.5. In addition, R0 is located on the left side of R2 and R3. In this way, it is determined that the third register is R2 and the fourth register is R3.

Implementation 4: For example, the third register and the fourth register may be determined as the to-be-processed registers in S203 based on a condition that a weighted sum of the value of the second information in the third register and the value of the second information in the fourth register is not greater than a weighted sum of values of the second information in any two adjacent registers included in the traffic monitoring apparatus. A packet 11' received after the fifth part in FIG. 4b-2 is implemented is still used as an example. A sequence of sorted registers is R0, R1, R2, R3, and R4. It is assumed that weights of R0, R1, R2, R3, and R4 are respectively 0.2, 0.2, 0.2, 0.1, and 0.3. A weighted sum of values of counter of every two adjacent registers R is calculated, and the obtained weighted sums of the values of counter are respectively (1*0.2+5*0.2)=1.2, (5*0.2+ 1*0.2)=1.2, (1*0.2+2*0.1)=0.4, and (2*0.1+2*0.3)=0.8. It is determined that a smallest weighted sum of the values of counter is 0.4, which is a weighted sum of the values of counter in R2 and R3. In addition, R0 is located on the left side of R2 and R3. In this way, it is determined that the third register is R2 and the fourth register is R3.

It can be learned that the traffic monitoring apparatus presets a corresponding weight for each register, and determines the to-be-processed third register and the to-be-processed fourth register in S203 according to a weighted sum of the weight and a value of the second information in the corresponding register, to interfere with a statistical result in a data bucket of the register by using the preset weight. In this way, the statistical result obtained by the traffic monitoring apparatus is closer to a real distribution status of the target performance indicator, further improving precision of traffic monitoring. It can be noted that the registers may correspond to a same weight or different weights. This is not limited in this embodiment of this application.

The traffic monitoring apparatus updates the fourth register by using the third register. In an example, the updated value of the first information in the fourth register may be obtained by performing weighted averaging on the values of the first information in the two registers, where the weights are the values of the second information in the two registers. For example, if the value of the first information in the third register is a, the value of the second information in the third register is b, the value of the first information in the fourth register is c, and the value of the second information in the fourth register is d, the updated value of the first information in the fourth register may be equal to $[(a*b+c*d)/(b+d)]$. In another example, an average value of the values of the first information in the two registers may be used as the updated value of the first information in the fourth register. For example, if the value of the first information in the third register is a, and the value of the first information in the fourth register is c, the updated value of the first information in the fourth register may be equal to $[(a+c)/2]$. In this embodiment of this application, a specific implementation of updating the fourth register by using the third register is not limited, and the foregoing is merely an example for description. An example in which the fourth register is updated through weighted average is used below for description.

In some possible implementations, the third register may be the register for temporarily storing the measured value of the target performance indicator of the to-be-monitored packet, and the fourth register is a sorted register that is configured to store statistical results of the target performance indicator and that is adjacent to the register for temporarily storing the measured value of the target performance indicator of the to-be-monitored packet. For example, S203 may include: The traffic monitoring apparatus updates the value of the first information in the fourth register according to the value of the first information in the third register, the value (namely, 1) of the second information in the third register, the value of the first information in the fourth register, and the value of the second information in the fourth register; increases the value of the second information in the fourth register by 1; and clears the value of the second information in the third register. A packet 12' received after the sixth part in FIG. 4b-3 is implemented is used as an example. A sequence of sorted registers is R0, R1, R2, R3, and R4. It is determined that the third register is R0 and the fourth register is R1. In this case, an updated value of value in R1 may be $[(4*1+6*1)/(1+1)]=5$, and an updated value of counter in R1 may be $(1+1)=2$. In addition, a value of counter in R0 is cleared, so that a measured value of the target performance indicator of a next to-be-monitored packet is temporarily stored. In addition, the traffic monitoring apparatus may further clear a value in R0.

In some other possible implementations, the third register and the fourth register may be the registers for storing the statistical results of the target performance indicator. For example, S203 may include: The traffic monitoring appara- tus updates the value of the first information in the fourth register according to the value of the first information in the third register, the value (namely, 1) of the second information in the third register, the value of the first information in the fourth register, and the value of the second information in the fourth register; increases the value of the second information in the fourth register by the value of the second information in the third register; and then clears the value of the second information in the third register. A packet 11' received after the fifth part in FIG. 4b-2 is implemented is used as an example. A sequence of sorted registers is R0, R1, R2, R3, and R4. It is determined that the third register is R2 and the fourth register is R3. In this case, an updated value of value in R3 may be [(8*1+11*2)/(1+2)]=10, and an updated value of counter in R3 may be (1+2)=3. In addition, a value of counter in R2 is cleared. If a sorted register for temporarily storing the measured value of the target performance indicator of the to-be-monitored packet is not adjacent to the third register, the traffic monitoring apparatus may monitor the second packet through data migration. For example, in the foregoing example, after the value of counter in R2 is cleared, the traffic monitoring apparatus may further migrate value=7 and counter=5 that are in R1 to R2, migrate value=6 and counter=1 that are in R0 to R1, and clears a value of counter in R0. In this way, it is ensured that the registers are still sorted in ascending order of the values of the first information after the second packet is monitored.

In this implementation, if the sorted register for temporarily storing the measured value of the target performance indicator of the to-be-monitored packet is adjacent to the third register and located before the third register, the traffic monitoring apparatus may update the value of the first information in the third register to the measured value of the target performance indicator of the second packet, and increase the value of the second information in the third register by 1.

It can be noted that, when determining that the traffic monitoring apparatus does not include an empty register, the traffic monitoring apparatus may further determine whether there is a value of the first information in the fourth register that matches the measured value of the target performance indicator of the second packet. If there is a value of the first information in the fourth register that matches the measured value of the target performance indicator of the second packet, the fourth register may be updated based on the second packet. An updated value of the first information in the fourth register may remain unchanged, or may be an average value (or a weighted average value) of the value of the first information in the fourth register before update and the measured value of the target performance indicator of the second packet. An updated value of the second information in the fourth register is the value of the second information in the fourth register before update plus 1.

In an example, that the traffic monitoring apparatus determines that the measured value of the target performance indicator of the second packet matches the value of the first information in the fourth register may include: The traffic monitoring apparatus determines that the measured value of the target performance indicator of the second packet falls within a value range corresponding to the value of the first information in the fourth register. For example, the value of the first information in the fourth register is 5, and the corresponding value range is 1 to 10. In this case, if the measured value of the target performance indicator of the second packet is 7, the traffic monitoring apparatus may determine that the measured value of the target performance indicator of the second packet matches the value of the first information in the fourth register. For another example, the value of the first information in the fourth register is 5, and the corresponding value range is 5±3. In this case, if the measured value of the target performance indicator of the second packet is 7, the traffic monitoring apparatus may determine that the measured value of the target performance indicator of the second packet matches the value of the first information in the fourth register.

In another example, that the traffic monitoring apparatus determines that the measured value of the target performance indicator of the second packet matches the value of the first information in the fourth register may include: The traffic monitoring apparatus determines that a difference between the measured value of the target performance indicator of the second packet and the value of the first information in the fourth register is less than a difference between the measured value of the target performance indicator of the second packet and a value of the first information in another register. For example, the traffic monitoring apparatus includes the fourth register and a fifth register, where the value of the first information in the fourth register is 5, and a value of the first information in the fifth register is 12. If the measured value of the target performance indicator of the second packet is 7, because (7-5)< (12-7), the traffic monitoring apparatus may determine that the measured value of the target performance indicator of the second packet matches the value of the first information in the fourth register.

During specific implementation, when determining that the traffic monitoring apparatus does not include an empty register, the traffic monitoring apparatus may further determine whether there is a value of the first information in a register that matches a measured value of the target performance indicator of a received packet. If there is a value of the first information in a register that matches the measured value of the target performance indicator of the received packet, the matched register may be updated based on the second packet. For example, the traffic monitoring apparatus may receive a third packet. The traffic monitoring apparatus determines that a measured value of the target performance indicator of the third packet matches the value of the first information in the third register. In this case, the traffic monitoring apparatus increases the value of the second information in the third register by 1. An updated value of the first information in the third register may remain unchanged, or may be an average value (or a weighted average value) of the value of the first information in the third register before update and the measured value of the target performance indicator of the third packet. For another example, the traffic monitoring apparatus may receive a fourth packet. The traffic monitoring apparatus determines that a measured value of the target performance indicator of the fourth packet matches the value of the first information in the fourth register. In this case, the traffic monitoring apparatus increases the value of the second information in the fourth register by 1. An updated value of the first information in the fourth register may remain unchanged, or may be an average value (or a weighted average value) of the value of the first information in the fourth register before update and the measured value of the target performance indicator of the fourth packet.

During specific implementation, a control apparatus (such as a CPU) in the network device that includes the traffic monitoring apparatus or a network device communicating with the network device that includes the traffic monitoring apparatus may obtain, at any required moment, a statistical result stored in each register from the traffic monitoring apparatus, and determine probability distribution of the target performance indicator based on the obtained statistical result. The probability distribution can reflect a status of the target performance indicator of the network device that includes the traffic monitoring apparatus till the obtaining moment, for example, reflect a proportion of packets whose target performance indicator of the network device is less than a value to all the received packets, or reflect a value, of the target performance indicator, corresponding to a qualification rate or a defect rate specified by the target performance indicator of the network device, where the value usually indicates a calibrated value of the target performance indicator of the network device.

It can be learned that, according to the method 200, a value range of the to-be-monitored target performance indicator does not need to be configured, and the value range does not need to be equally divided to determine a depth of each data bucket either. Instead, the first information indicating the depth of the data bucket that carries the measured value of the target performance indicator of the to-be-monitored packet, and the second information indicating the quantity of packets that are in the received packets and that match the value of the first information in each register are used as two statistical parameters of the register, to flexibly update values of the two statistical parameters in each register according to the measured value of the target performance indicator of the received packet, so that statistics on the target performance indicator are collected when it is determined that there is no empty register. This not only reduces configuration workload for collecting the statistics on the target performance indicator, but also makes it possible to obtain a more comprehensive and accurate statistical result because an entire statistical value range and a statistical value sub-range of each register are not limited. Therefore, an actual operating status of the network device can be learned more accurately.

In the foregoing method 100 and method 200, a larger quantity of registers in the traffic monitoring apparatus that participate in statistics collection indicates that a CDF generated according to the statistical result is closer to a CDF obtained based on all real values of the target performance indicator, that is, indicates a more accurate statistical result. Therefore, in the method 100 and the method 200, a monitoring effect of a performance indicator of a network device with rich hardware resources (namely, more register resources) is more prominent.

Based on the foregoing method embodiments, an embodiment of this application further provides a traffic monitoring apparatus. The following describes the apparatus with reference to an accompanying drawing.

Figure 7:
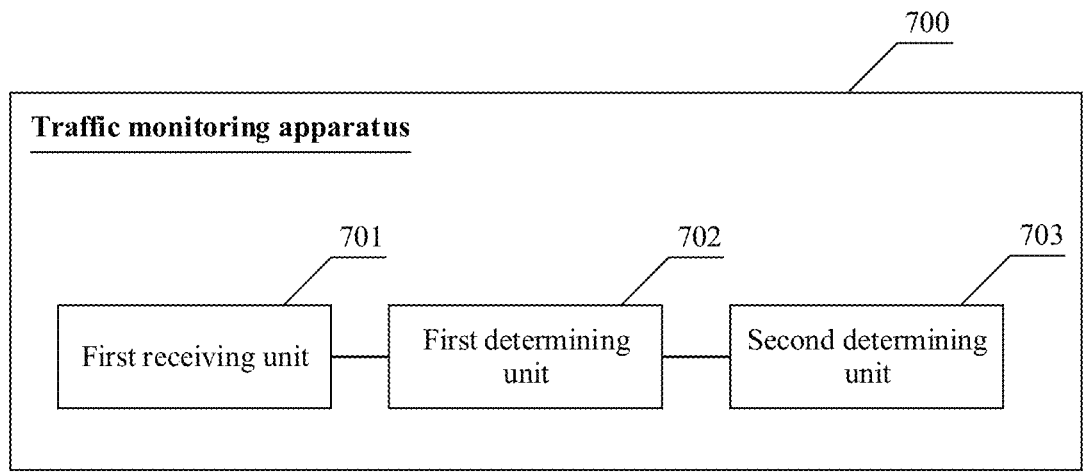
FIG. 7 is a schematic diagram of a structure of a traffic monitoring apparatus 700 according to an embodiment of this application.

FIG. 7 is a schematic diagram of a structure of a traffic monitoring apparatus 700 according to an embodiment of this application. The apparatus 700 may be, for example, the traffic monitoring apparatus 120, and executes the method shown in FIG. 3. The apparatus 700 may include a first receiving unit 701, a first determining unit 702, and a second determining unit 703.

The first receiving unit 701 is configured to receive a first packet.

For a specific implementation of the first receiving unit 701, refer to detailed descriptions of S101 in the embodiment in FIG. 5.

The first determining unit 702 is configured to determine whether the traffic monitoring apparatus 700 includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the traffic monitoring apparatus 700 and that match a value of the first information in the first register.

For a specific implementation of the first determining unit 702, refer to detailed descriptions of S102 in the embodiment in FIG. 5.

The second determining unit 703 is configured to: in response to determining, by the traffic monitoring apparatus 700, that the traffic monitoring apparatus 700 includes the first register, update the value of the first information in the first register to a measured value of the target performance indicator of the first packet, and increase the value of the second information in the first register by 1.

For a specific implementation of the second determining unit 703, refer to detailed descriptions of S103 in the embodiment in FIG. 5.

In an embodiment, the apparatus 700 further includes a second receiving unit, a third determining unit, and a first updating unit.

The second receiving unit is configured to receive a second packet.

For a specific implementation of the second receiving unit, refer to detailed descriptions of S201 in the embodiment in FIG. 6.

The third determining unit is configured to determine whether the traffic monitoring apparatus 700 includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the traffic monitoring apparatus 700 and that match a value of the first information in the second register.

For a specific implementation of the third determining unit, refer to detailed descriptions of S202 in the embodiment in FIG. 6.

The first updating unit is configured to: in response to determining, by the traffic monitoring apparatus 700, that the traffic monitoring apparatus 700 does not include the second register, update, according to a value of the first information in a third register included in the traffic monitoring apparatus 700 and a value of the second information in the third register, a value of the first information in a fourth register included in the traffic monitoring apparatus 700 and a value of the second information in the fourth register, where an updated value of the second information in the fourth register is equal to a sum of the value of the second information in the third register and the value of the second information in the fourth register; and clear the value of the second information in the third register.

For a specific implementation of the first updating unit, refer to detailed descriptions of S203 in the embodiment in FIG. 6.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the traffic monitoring apparatus 700. Alternatively, the third register is adjacent to the fourth register, and a weighted sum of the value of the second information in the third register and the value of the second information in the fourth register is not greater than a weighted sum of values of the second information in any two adjacent registers included in the traffic monitoring apparatus 700.

In an embodiment, the apparatus 700 further includes a fourth determining unit and a second updating unit. The fourth determining unit is configured to determine that a measured value of the target performance indicator of the second packet matches an updated value of the first information in the fourth register. The second updating unit is configured to increase the value of the second information in the fourth register by 1.

In an example, the fourth determining unit is configured to determine that the measured value of the target performance indicator of the second packet falls within a value range corresponding to the value of the first information in the fourth register.

In another example, the fourth determining unit is configured to determine that a difference between the measured value of the target performance indicator of the second packet and the value of the first information in the fourth register is less than a difference between the measured value of the target performance indicator of the second packet and a value of the first information in another register.

In an embodiment, the apparatus 700 further includes a fifth determining unit and a third updating unit. The fifth determining unit is configured to determine that a measured value of the target performance indicator of the second packet does not match an updated value of the first information in the fourth register. The third updating unit is configured to: update the value of the first information in the third register to the measured value of the target performance indicator of the second packet, and increase the value of the second information in the third register by 1.

In an embodiment, the apparatus 700 further includes a third receiving unit, a sixth determining unit, and a fourth updating unit. The third receiving unit is configured to receive a third packet. The sixth determining unit is configured to determine that a measured value of the target performance indicator of the third packet matches the value of the first information in the third register. The fourth updating unit is configured to increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the traffic monitoring apparatus 700 are arranged in ascending order of values of the first information in the registers. Alternatively, the registers in the traffic monitoring apparatus 700 are arranged in descending order of values of the first information in the registers.

In this embodiment of this application, the target performance indicator includes any one of the following indicators: a latency, a packet length, a packet receiving time interval, or queue usage.

In this embodiment of this application, the traffic monitoring apparatus 700 is included in a processing chip, for example, may be integrated into an NP chip.

For specific functions and implementations that can be performed by the traffic monitoring apparatus 700, refer to corresponding descriptions in the method shown in FIG. 3, the method 100 shown in FIG. 5, and the method 200 shown in FIG. 6. Details are not described herein again.

Figure 8:
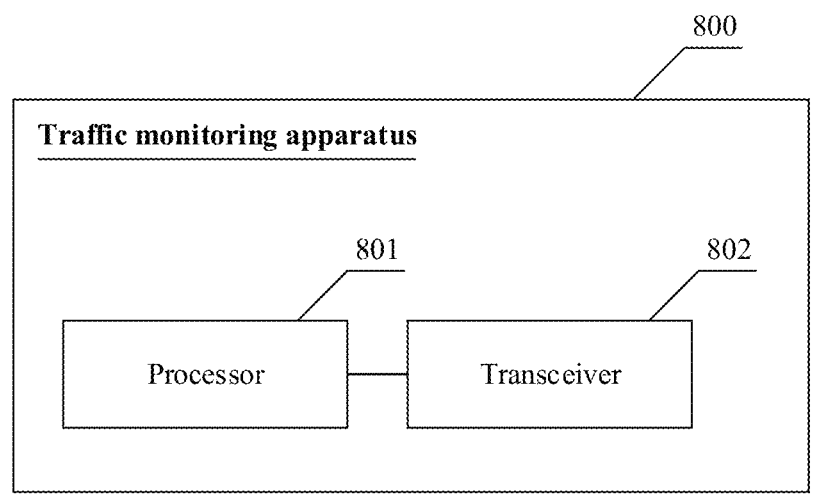
FIG. 8 is a schematic diagram of a structure of a traffic monitoring apparatus 800 according to an embodiment of this application.

Correspondingly, an embodiment of this application further provides a traffic monitoring apparatus 800, as shown in FIG. 8. The apparatus 800 includes a processor 801 and a transceiver 802.

The transceiver 802 is configured to receive a first packet.

The processor 801 is configured to determine whether the traffic monitoring apparatus includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the traffic monitoring apparatus and that match a value of the first information in the first register.

The processor 801 is further configured to: in response to determining that the traffic monitoring apparatus includes the first register, update the value of the first information in the first register to a measured value of the target performance indicator of the first packet, and increase the value of the second information in the first register by 1.

For a specific implementation of the transceiver 802, refer to detailed descriptions of S101 in the embodiment in FIG. 5. For a specific implementation of the processor 801, refer to detailed descriptions of S102 and S103 in the embodiment in FIG. 5.

In an embodiment, the transceiver 802 is further configured to receive a second packet. The processor 801 is further configured to determine whether the traffic monitoring apparatus 800 includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the traffic monitoring apparatus 800 and that match a value of the first information in the second register. The processor 801 is configured to: in response to determining, by the traffic monitoring apparatus 800, that the traffic monitoring apparatus 800 does not include the second register, update, according to a value of the first information in a third register included in the traffic monitoring apparatus 800 and a value of the second information in the third register, a value of the first information in a fourth register included in the traffic monitoring apparatus 800 and a value of the second information in the fourth register, where an updated value of the second information in the fourth register is equal to a sum of the value of the second information in the third register and the value of the second information in the fourth register; and clear the value of the second information in the third register. For a specific implementation of the transceiver 802, refer to detailed descriptions of S201 in the embodiment in FIG. 6. For a specific implementation of the processor 801, refer to detailed descriptions of S202 and S203 in the embodiment in FIG. 6.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the traffic monitoring apparatus 800. Alternatively, the third register is adjacent to the fourth register, and a weighted sum of the value of the second information in the third register and the value of the second information in the fourth register is not greater than a weighted sum of values of the second information in any two adjacent registers included in the traffic monitoring apparatus 800.

In an embodiment, the processor 801 is further configured to: determine that a measured value of the target performance indicator of the second packet matches an updated value of the first information in the fourth register, and increase the value of the second information in the fourth register by 1. The processor 801 is configured to determine that the measured value of the target performance indicator of the second packet falls within a value range corresponding to the value of the first information in the fourth register. Alternatively, the processor 801 is configured to determine that a difference between the measured value of the target performance indicator of the second packet and the value of the first information in the fourth register is less than a difference between the measured value of the target performance indicator of the second packet and a value of the first information in another register.

In an embodiment, the processor 801 is further configured to: determine that a measured value of the target performance indicator of the second packet does not match an updated value of the first information in the fourth register, update 800, the value of the first information in the third register to the measured value of the target performance indicator of the second packet, and increase the value of the second information in the third register by 1.

In an embodiment, the transceiver 802 is further configured to receive a third packet. The processor 801 is further configured to: determine that a measured value of the target performance indicator of the third packet matches the value of the first information in the third register, and increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the traffic monitoring apparatus 800 are arranged in ascending order of values of the first information in the registers. Alternatively, the registers in the traffic monitoring apparatus 800 are arranged in descending order of values of the first information in the registers.

In this embodiment of this application, the target performance indicator includes any one of the following indicators: a latency, a packet length, a packet receiving time interval, or queue usage.

In this embodiment of this application, the traffic monitoring apparatus 800 is included in a processing chip, for example, may be integrated into an NP chip.

For specific functions and implementations that can be performed by the traffic monitoring apparatus 800, refer to corresponding descriptions in the method shown in FIG. 3, the method 100 shown in FIG. 5, and the method 200 shown in FIG. 6. Details are not described herein again.

Figure 9:
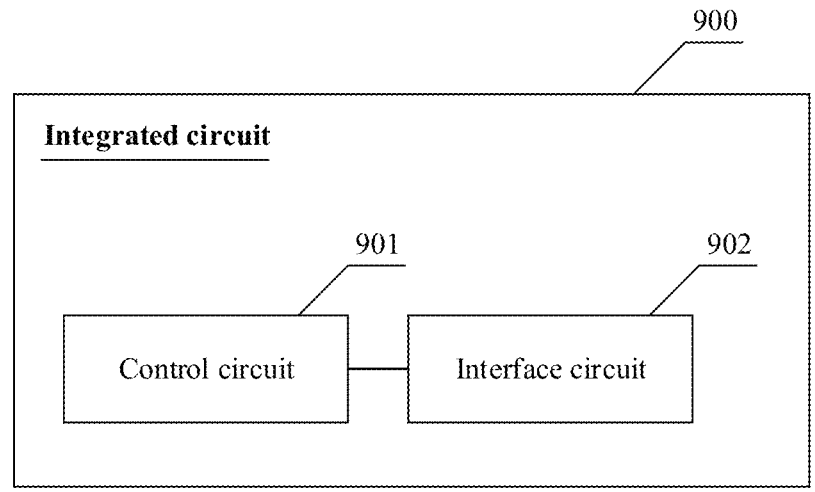
FIG. 9 is a schematic diagram of a structure of an integrated circuit 900 according to an embodiment of this application.

Correspondingly, an embodiment of this application further provides an integrated circuit 900, as shown in FIG. 9. The integrated circuit 900 includes a control circuit 901 and an interface circuit 902.

The interface circuit 902 is configured to receive a first packet.

The control circuit 901 is configured to determine whether the integrated circuit 900 includes a first register, where the first register includes first information and second information, a value of the second information in the first register is 0, the first information in the first register indicates a depth of a data bucket that carries a measured value of a target performance indicator of a to-be-monitored packet, and the second information in the first register indicates a quantity of packets that are in packets received by the integrated circuit 900 and that match a value of the first information in the first register.

The control circuit 901 is further configured to: in response to determining that the integrated circuit 900 includes the first register, update the value of the first information in the first register to a measured value of the target performance indicator of the first packet, and increase the value of the second information in the first register by 1.

For a specific implementation of the interface circuit 902, refer to detailed descriptions of S101 in the embodiment in FIG. 5. For a specific implementation of the control circuit 901, refer to detailed descriptions of S102 and S103 in the embodiment in FIG. 5.

In an embodiment, the interface circuit 902 is further configured to receive a second packet. The control circuit 901 is further configured to determine whether the integrated circuit 900 includes a second register, where the second register includes the first information and the second information, a value of the second information in the second register is 0, the first information in the second register indicates a depth of a data bucket that carries a measured value of the target performance indicator of a to-be-monitored packet, and the second information in the second register indicates a quantity of packets that are in the packets received by the integrated circuit 900 and that match a value of the first information in the second register. The control circuit 901 is further configured to: in response to determining, by the integrated circuit 900, that the integrated circuit 900 does not include the second register, update, according to a value of the first information in a third register included in the integrated circuit 900 and a value of the second information in the third register, a value of the first information in a fourth register included in the integrated circuit 900 and a value of the second information in the fourth register, where an updated value of the second information in the fourth register is equal to a sum of the value of the second information in the third register and the value of the second information in the fourth register; and clear the value of the second information in the third register.

For a specific implementation of the interface circuit 902, refer to detailed descriptions of S601 in the embodiment in FIG. 6. For a specific implementation of the control circuit 901, refer to detailed descriptions of S202 and S203 in the embodiment in FIG. 6.

The third register is adjacent to the fourth register, and the sum of the value of the second information in the third register and the value of the second information in the fourth register is less than a first threshold. Alternatively, the third register is adjacent to the fourth register, and a weighted sum of the value of the second information in the third register and the value of the second information in the fourth register is less than a first threshold. Alternatively, the third register is adjacent to the fourth register, and the sum of the value of the second information in the third register and the value of the second information in the fourth register is not greater than a sum of values of the second information in any two adjacent registers included in the integrated circuit 900. Alternatively, the third register is adjacent to the fourth register, and a weighted sum of the value of the second information in the third register and the value of the second information in the fourth register is not greater than a weighted sum of values of the second information in any two adjacent registers included in the integrated circuit 900.

In an embodiment, the control circuit 901 is further configured to: determine that a measured value of the target performance indicator of the second packet matches an updated value of the first information in the fourth register, and increase the value of the second information in the fourth register by 1. The control circuit 901 is configured to determine that the measured value of the target performance indicator of the second packet falls within a value range corresponding to the value of the first information in the fourth register. Alternatively, the control circuit 901 is configured to determine that a difference between the measured value of the target performance indicator of the second packet and the value of the first information in the fourth register is less than a difference between the measured value of the target performance indicator of the second packet and a value of the first information in another register.

In an embodiment, the control circuit 901 is further configured to: determine that a measured value of the target performance indicator of the second packet does not match an updated value of the first information in the fourth register, update the value of the first information in the third register to the measured value of the target performance indicator of the second packet, and increase the value of the second information in the third register by 1.

In an embodiment, the transceiver is further configured to receive a third packet. The control circuit 901 is further configured to: determine that a measured value of the target performance indicator of the third packet matches the value of the first information in the third register, and increase the value of the second information in the third register by 1.

In an example, the third register is located between the first register and the fourth register, the third register is adjacent to the first register and adjacent to the fourth register, the value of the first information in the third register is greater than the value of the first information in the first register and less than the value of the first information in the fourth register.

In this embodiment of this application, the registers in the integrated circuit 900 are arranged in ascending order of values of the first information in the registers. Alternatively, the registers in the integrated circuit 900 are arranged in descending order of values of the first information in the registers.

In this embodiment of this application, the target performance indicator includes any one of the following indicators: a latency, a packet length, a packet receiving time interval, or queue usage.

In this embodiment of this application, the integrated circuit 900 is included in a processing chip, for example, may be integrated into an NP chip.

For specific functions and implementations that can be performed by the integrated circuit 900, refer to corresponding descriptions in the method shown in FIG. 3, the method 100 shown in FIG. 5, and the method 200 shown in FIG. 6. Details are not described herein again.

Figure 10:
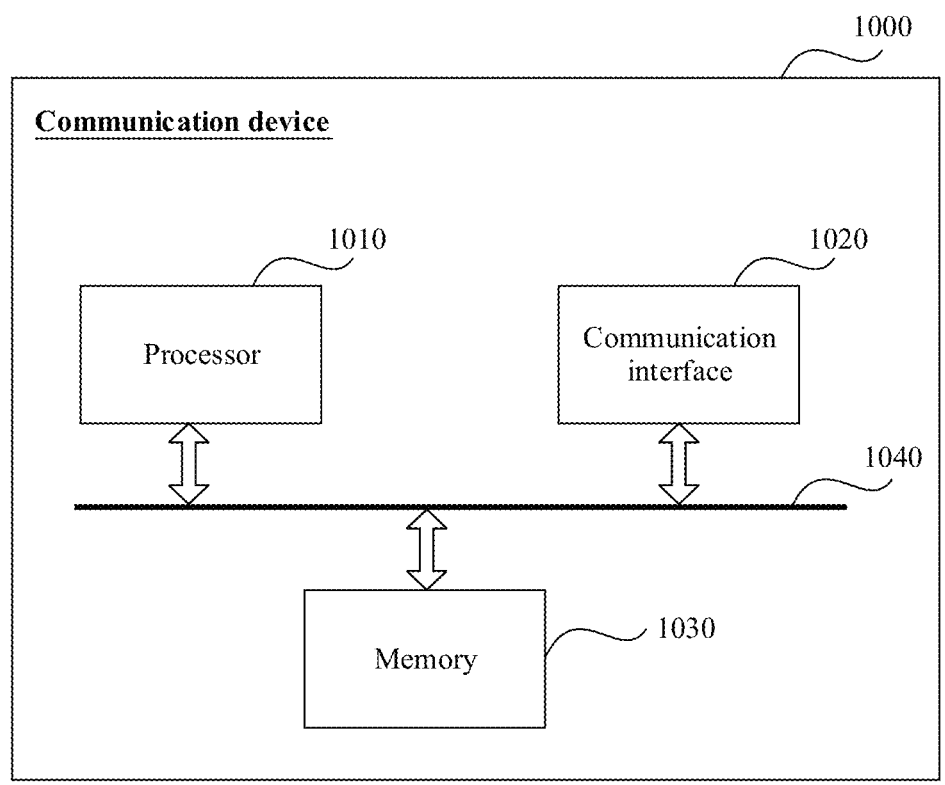
FIG. 10 is a schematic diagram of a structure of a communication device 1000 according to an embodiment of this application.

FIG. 10 is a schematic diagram of a structure of a communication device 1000 according to an embodiment of this application. For example, the communication device 1000 may be the network device 10 in the embodiment shown in FIG. 2, the network device that includes the traffic monitoring apparatus 700 in the embodiment shown in FIG. 7, the network device that includes the traffic monitoring apparatus 800 in the embodiment shown in FIG. 8, or the network device that includes the integrated circuit 900 in the embodiment shown in FIG. 9.

Refer to FIG. 10. The communication device 1000 includes a processor 1010, a communication interface 1020, and a memory 1030. There may be one or more processors 1010 in the communication device 1000. In FIG. 10, one processor is used as an example. In this embodiment of this application, the processor 1010, the communication interface 1020, and the memory 1030 may be connected by using a bus system or in another manner. In FIG. 10, an example in which the processor 1010, the communication interface 1020, and the memory 1030 are connected by using a bus system 1040 is used.

The processor 1010 may be a CPU, an NP, or a combination of a CPU and an NP. The processor 1010 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The communication interface 1020 is configured to receive and send a packet. Specifically, the communication interface 1020 may include a receiving interface and a sending interface. The receiving interface may be configured to receive a packet, and the sending interface may be configured to send a packet. There may be one or more communication interfaces 1020.

The memory 1030 may include a volatile memory, for example, a random-access memory (RAM). The memory 1030 may further include a non-volatile memory, for example, a flash memory, a hard disk drive (HDD), or a solid-state drive (SSD). The memory 1030 may further include a combination of the foregoing types of memories.

Optionally, the memory 1030 stores an operating system, a program, an executable module or a data structure, a subset thereof, or an extended set thereof, where the program may include various operation instructions, to implement various operations. The operating system may include various system programs, to implement various basic services and process a hardware-based task. The processor 1010 may read a program in the memory 1030, to implement the traffic monitoring method provided in this embodiment of this application.

The memory 1030 may be a storage device in the communication device 1000, or may be a storage apparatus independent of the communication device 1000.

The bus system 1040 may be a peripheral component interconnect (PCI) bus, an extended industry standard architecture (EISA) bus, or the like. The bus system 1040 may be classified into an address bus, a data bus, a control bus, and the like. For ease of representation, only one thick line is for representing the bus in FIG. 10, but this does not mean that there is only one bus or only one type of bus.

Figure 11:
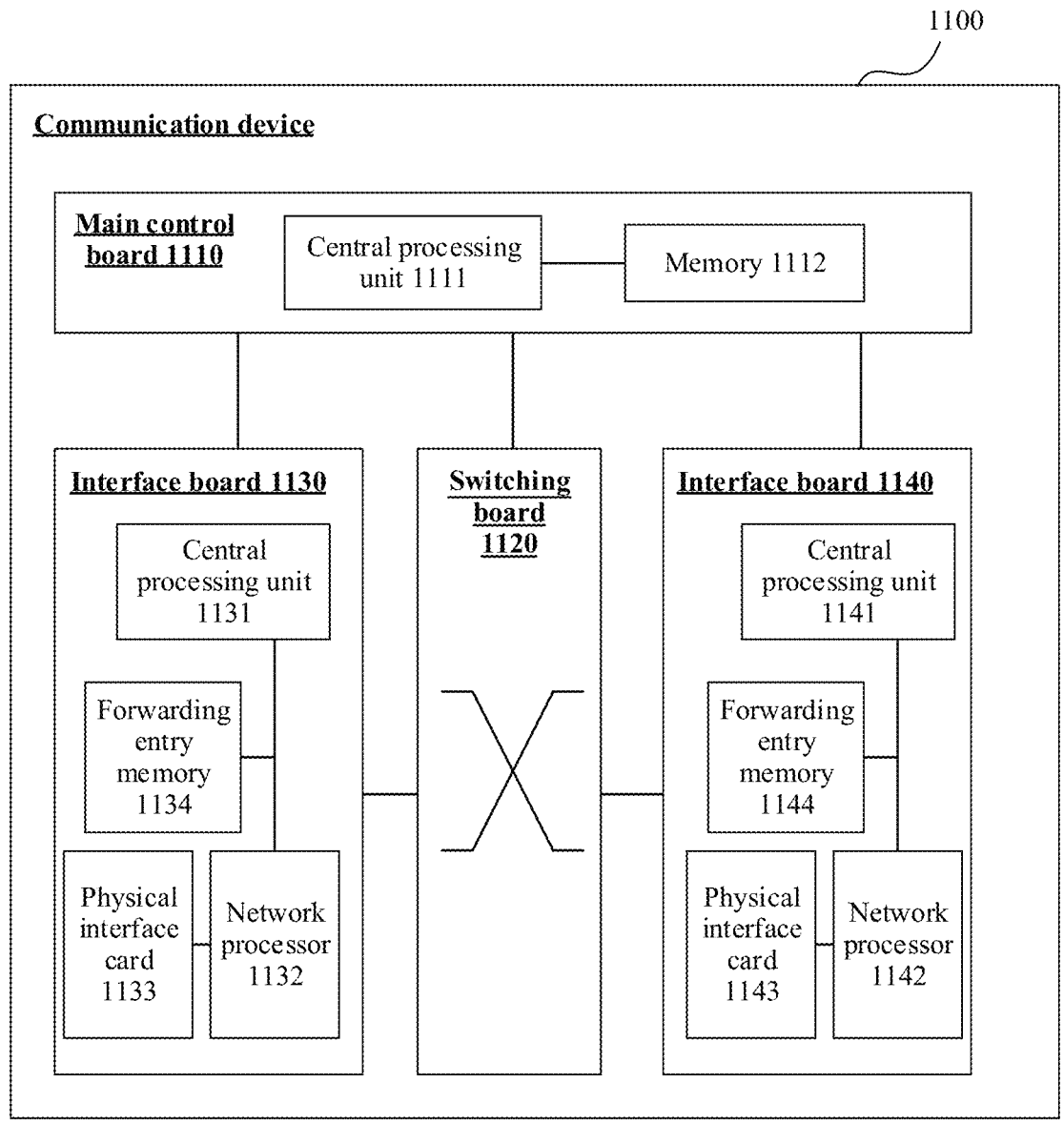
FIG. 11 is a schematic diagram of a structure of a communication device 1100 according to an embodiment of this application.

FIG. 11 is a schematic diagram of a structure of another communication device 1100 according to an embodiment of this application. For example, the communication device 1100 may be configured as the network device 10 in the embodiment shown in FIG. 2, the network device that includes the traffic monitoring apparatus 700 in the embodiment shown in FIG. 7, the network device that includes the traffic monitoring apparatus 800 in the embodiment shown in FIG. 8, the network device that includes the integrated circuit 900 in the embodiment shown in FIG. 9, or the communication device 1000 shown in FIG. 10.

The communication device 1100 includes a main control board 1110 and an interface board 1130.

The main control board 1110 is also referred to as a main processing unit (MPU) or a route processor card. The main control board 1110 controls and manages components in the communication device 1100, including functions such as routing calculation, device management, device maintenance, and protocol processing. The main control board 1110 includes a central processing unit 1111 and a memory 1112.

The interface board 1130 is also referred to as a line processing unit (LPU), a line card, or a service board. The interface board 1130 is configured to: provide various service interfaces, and forward a data packet. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 1130 includes a central processing unit 1131, a network processor 1132, a forwarding entry memory 1134, and a physical interface card (PIC) 1133.

The central processing unit 1131 on the interface board 1130 is configured to: control and manage the interface board 1130, and communicate with the central processing unit 1111 on the main control board 1110.

The network processor 1132 is configured to implement packet forwarding processing. A form of the network processor 1132 may be a forwarding chip. Specifically, processing on an uplink packet includes processing at a packet ingress interface and forwarding table lookup, and processing on a downlink packet includes forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface, and the physical interface is also referred to as a physical port. The physical interface card 1133 corresponds to a FlexE physical interface in a system architecture. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1130 may alternatively perform a function of the network processor 1132, for example, implement software forwarding based on a general-purpose CPU. Therefore, the network processor 1132 is not necessary in the physical interface card 1133.

Optionally, the communication device 1100 includes a plurality of interface boards. For example, the communication device 1100 further includes an interface board 1140. The interface board 1140 includes a central processing unit 1141, a network processor 1142, a forwarding entry memory 1144, and a physical interface card 1143.

Optionally, the communication device 1100 further includes a switching board 1120. The switching board 1120 may also be referred to as a switch fabric unit (SFU). When the communication device has a plurality of interface boards 1130, the switching board 1120 is configured to complete data exchange between the interface boards. For example, the interface board 1130 and the interface board 1140 may communicate with each other by using the switching board 1120.

The main control board 1110 is coupled to the interface board 1130. For example, the main control board 1110, the interface board 1130 and the interface board 1140, and the switching board 1120 are connected to a system backboard by using a system bus for interworking. In an embodiment, an inter-process communication (IPC) channel is established between the main control board 1110 and the interface board 1130, and the main control board 1110 and the interface board 1130 communicate with each other through the IPC channel.

Logically, the communication device 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

If the communication device 1100 is configured as the network device 10, the central processing unit 1111 may obtain a measured value of a target performance indicator of a first packet; determine whether an empty first register is included; and in response to determining that the first register is included, update a value of first information in the first register to the measured value of the target performance indicator of the first packet, and increase a value of second information in the first register by 1. The network processor 1132 may trigger the physical interface card 1133 to receive the first packet.

It can be understood that the transceiver 802 in the traffic monitoring apparatus 800 may be equivalent to the physical interface card 1133 or the physical interface card 1143 in the communication device 1100; the processor 801 in the traffic monitoring apparatus 800 may be equivalent to the central processing unit 1111 or the central processing unit 1131 in the communication device 1100; the first receiving unit 701 in the traffic monitoring apparatus 700 may be equivalent to the physical interface card 1133 or the physical interface card 1143 in the communication device 1100; and the first determining unit 702, the second determining unit 703, and the like in the traffic monitoring apparatus 700 may be equivalent to the central processing unit 1111 or the central processing unit 1131 in the communication device 1100.

It can be understood that operations performed on the interface board 1140 are consistent with operations performed on the interface board 1130 in this embodiment of this application. For brevity, details are not described again. It can be understood that the communication device 1100 in this embodiment may correspond to the traffic monitoring apparatus or the integrated circuit in the foregoing method embodiments. The main control board 1110 and the interface board 1130 and/or the interface board 1140 in the communication device 1100 may implement functions of the traffic monitoring apparatus and/or various operations implemented by the traffic monitoring apparatus in the foregoing method embodiments. For brevity, details are not described again.

It can be understood that, there may be one or more main control boards. When there are a plurality of main control boards, the main control boards may include an active main control board and a standby main control board. There may be one or more interface boards. A stronger data processing capability of the communication device indicates a larger quantity of provided interface boards. There may also be one or more physical interface cards on the interface board. There may be no switching board or one or more switching boards. When there are a plurality of switching boards, load balancing and redundancy backup may be implemented together. In a centralized forwarding architecture, the communication device may not need a switching board, and the interface board undertakes a service data processing function of an entire system. In a distributed forwarding architecture, the communication device may have at least one switching board, and data is exchanged between a plurality of interface boards by using the switching board, to provide a capability of exchanging and processing a large capacity of data. Therefore, a data access and processing capability of the communication device in the distributed architecture is greater than the device in the centralized architecture. Optionally, a form of the communication device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a communication device such as a low-end switch or a router) has a low data exchange and processing capability. A specific architecture that is to be used depends on a specific networking deployment scenario.

In some possible embodiments, the foregoing network device or the foregoing communication device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as each network device in FIG. 1. For example, the network device or the communication device may be implemented based on a general-purpose physical server in combination with a network functions virtualization (NFV) technology. The network device or the communication device is a virtual host, a virtual router, or a virtual switch. By reading this application, persons skilled in the art may obtain, on the general-purpose physical server through virtualization with reference to the NFV technology, the network device or the communication device having the foregoing functions. Details are not described herein.

It can be understood that the communication devices in the foregoing product forms separately have any function implemented by the network device or the communication device in the foregoing method embodiments. Details are not described herein.

An embodiment of this application further provides a chip, including a processor and an interface circuit. The interface circuit is configured to: receive instructions, and transmit the instructions to the processor. The processor may be, for example, a specific implementation form of the traffic monitoring apparatus 800 shown in FIG. 8, and may be configured to perform the foregoing traffic monitoring method. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated circuit (ASIC), a system on a chip (SoC), a central processing unit (CPU), a network processor (NP), a digital signal processing circuit (DSP), a microcontroller unit (MCU), a programmable controller (PLD), or another integrated chip.

An embodiment of this application further provides a computer-readable storage medium, including instructions or a computer program. When the instructions or the computer program is run on a computer, the computer is enabled to perform the traffic monitoring method provided in the foregoing embodiment.

An embodiment of this application further provides a computer program product, including instructions or a computer program. When the computer program product runs on a computer, the computer is enabled to perform the traffic monitoring method provided in the foregoing embodiment.

In the specification, claims, and accompanying drawings of this application, the terms "first", "second", "third", "fourth", and the like (if used) are intended to distinguish between similar objects but do not necessarily indicate a specific order or sequence. It can be understood that, data termed in such a way is interchangeable in proper circumstances, so that embodiments described herein can be implemented in an order other than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

Persons skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it can be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in embodiments of this application. The storage medium includes any medium that can store program code, such as a USB flash drive, a removable hard disk, a read-only memory (ROM a random access memory (RAM), a magnetic disk, or an optical disc.

Persons skilled in the art can be aware that, in the foregoing one or more examples, services described in the present application may be implemented by using hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or a dedicated computer.

The objectives, technical solutions, and beneficial effects of the present application have been further described in detail in the foregoing specific implementations. It can be understood that the foregoing descriptions are merely specific implementations of the present application.

The foregoing embodiments are merely intended for describing the technical solutions of this application, but not for limiting this application. Although this application is described in detail with reference to the foregoing embodiments, persons of ordinary skill in the art can understand that they may still make modifications to the technical solutions described in the foregoing embodiments, or make equivalent replacements to some technical features thereof, without departing from the scope of the technical solutions of the embodiments of this application.

What is claimed is:

1. A traffic monitoring method, wherein the method comprises:

receiving, by a traffic monitoring apparatus, a first packet;

determining, by the traffic monitoring apparatus, whether the traffic monitoring apparatus comprises a first register, wherein the first register comprises first information and second information, wherein the first information in the first register indicates a depth of a data bucket that carries a measured value of a target performance indicator of a to-be-monitored packet, and wherein the second information in the first register has a value of 0 and indicates a quantity of packets that are in packets received by the traffic monitoring apparatus and that match a value of the first information in the first register; and in response to determining, by the traffic monitoring apparatus, that the traffic monitoring apparatus comprises the first register, updating, by the traffic monitoring apparatus, the value of the first information in the first register to a measured value of the target performance indicator of the first packet, and increasing the value of the second information in the first register by 1.

2. The method according to claim 1, wherein the method further comprises:

receiving, by the traffic monitoring apparatus, a second packet;

determining, by the traffic monitoring apparatus, whether the traffic monitoring apparatus comprises a second register, wherein the second register comprises the first information and the second information, wherein the first information in the second register indicates a depth of a data bucket that carries a measured value of the target performance indicator of a to-be-monitored packet, and wherein the second information in the second register has a value of 0 and indicates a quantity of packets that are in the packets received by the traffic monitoring apparatus and that match a value of the first information in the second register; and in response to determining, by the traffic monitoring apparatus, that the traffic monitoring apparatus does not comprise the second register, performing, by the traffic monitoring apparatus, the following operations:

updating, according to a value of the first information in a third register comprised in the traffic monitoring apparatus and a value of the second information in the third register, a value of the first information in a fourth register comprised in the traffic monitoring apparatus and a value of the second information in the fourth register, wherein an updated value of the second information in the fourth register is equal to a sum of the value of the second information in the third register and the value of the second information in the fourth register; and clearing the value of the second information in the third register.

3. The method according to claim 2, wherein
the third register is adjacent to the fourth register, and the sum of the value of the second information in the third register and the value of the second information in the fourth register is less than a first threshold.

4. The method according to claim 2, wherein
the third register is adjacent to the fourth register, and a weighted sum of the value of the second information in the third register and the value of the second information in the fourth register is less than a first threshold.

5. The method according to claim 2, wherein
the third register is adjacent to the fourth register, and the sum of the value of the second information in the third register and the value of the second information in the fourth register is not greater than a sum of values of the second information in any two adjacent registers comprised in the traffic monitoring apparatus.

6. The method according to claim 2, wherein
the third register is adjacent to the fourth register, and a weighted sum of the value of the second information in the third register and the value of the second information in the fourth register is not greater than a weighted sum of values of the second information in any two adjacent registers comprised in the traffic monitoring apparatus.

7. The method according to claim 2, wherein the method further comprises:
determining, by the traffic monitoring apparatus, that a measured value of the target performance indicator of the second packet matches an updated value of the first information in the fourth register, and increasing, by the traffic monitoring apparatus, the value of the second information in the fourth register by 1.

8. The method according to claim 7, wherein the determining, by the traffic monitoring apparatus, that the measured value of the target performance indicator of the second packet matches the updated value of the first information in the fourth register comprises:
determining, by the traffic monitoring apparatus, that the measured value of the target performance indicator of the second packet falls within a value range corresponding to the value of the first information in the fourth register.

9. The method according to claim 7, wherein the determining, by the traffic monitoring apparatus, that the measured value of the target performance indicator of the second packet matches the updated value of the first information in the fourth register comprises:
determining, by the traffic monitoring apparatus, that a difference between the measured value of the target performance indicator of the second packet and the value of the first information in the fourth register is less than a difference between the measured value of the target performance indicator of the second packet and a value of the first information in another register.

10. The method according to claim 2, wherein the method further comprises:

determining, by the traffic monitoring apparatus, that a measured value of the target performance indicator of the second packet does not match an updated value of the first information in the fourth register, updating, by the traffic monitoring apparatus, the value of the first information in the third register to the measured value of the target performance indicator of the second packet, and increasing the value of the second information in the third register by 1.

11. The method according to claim 10, wherein the method further comprises:
receiving, by the traffic monitoring apparatus, a third packet; and
determining, by the traffic monitoring apparatus, that a measured value of the target performance indicator of the third packet matches the value of the first information in the third register, and increasing, by the traffic monitoring apparatus, the value of the second information in the third register by 1.

12. The method according to claim 10, wherein the third register is located between the first register and the fourth register, the third register is adjacent to the first register and adjacent to the fourth register, the value of the first information in the third register is greater than the value of the first information in the first register and less than the value of the first information in the fourth register.

13. The method according to claim 1, wherein the registers in the traffic monitoring apparatus are arranged in ascending order of values of the first information in the registers.

14. The method according to claim 1, wherein the target performance indicator comprises any one of the following indicators:
a latency, a packet length, a packet receiving time interval, or queue usage.

15. The method according to claim 1, wherein
the traffic monitoring apparatus is comprised in a network processor (NP) chip.

16. A traffic monitoring apparatus, comprising:
a processor; and
a transceiver; and
wherein the transceiver is configured to receive a first packet;
wherein the processor is configured to determine whether the traffic monitoring apparatus comprises a first register, wherein the first register comprises first information and second information, wherein the first information in the first register indicates a depth of a data bucket that carries a measured value of a target performance indicator of a to-be-monitored packet, and wherein the second information in the first register has a value of 0 and indicates a quantity of packets that are in packets received by the traffic monitoring apparatus and that match a value of the first information in the first register; and
wherein the processor is further configured to: in response to determining that the traffic monitoring apparatus comprises the first register, update the value of the first information in the first register to a measured value of the target performance indicator of the first packet, and increase the value of the second information in the first register by 1.

17. The apparatus according to claim 16, wherein
the transceiver is further configured to receive a second packet;
wherein the processor is further configured to determine whether the traffic monitoring apparatus comprises a second register, wherein the second register comprises the first information and the second information, wherein the first information in the second register indicates a depth of a data bucket that carries a measured value of the target performance indicator of a to-be-monitored packet, and wherein the second information in the second register has a value of 0 and indicates a quantity of packets that are in the packets received by the traffic monitoring apparatus and that match a value of the first information in the second register; and wherein the processor is further configured to: in response to determining, by the traffic monitoring apparatus, that the traffic monitoring apparatus does not comprise the second register, update, according to a value of the first information in a third register comprised in the traffic monitoring apparatus and a value of the second information in the third register, a value of the first information in a fourth register comprised in the traffic monitoring apparatus and a value of the second information in the fourth register, wherein an updated value of the second information in the fourth register is equal to a sum of the value of the second information in the third register and the value of the second information in the fourth register; and clear the value of the second information in the third register.

18. The apparatus according to claim 17, wherein the third register is adjacent to the fourth register, and the sum of the value of the second information in the third register and the value of the second information in the fourth register is less than a first threshold.

19. The apparatus according to claim 17, wherein the third register is adjacent to the fourth register, and a weighted sum of the value of the second information in the third register and the value of the second information in the fourth register is less than a first threshold.

20. The apparatus according to claim 17, wherein the third register is adjacent to the fourth register, and the sum of the value of the second information in the third register and the value of the second information in the fourth register is not greater than a sum of values of the second information in any two adjacent registers comprised in the traffic monitoring apparatus.

21. The apparatus according to claim 17, wherein the third register is adjacent to the fourth register, and a weighted sum of the value of the second information in the third register and the value of the second information in the fourth register is not greater than a weighted sum of values of the second information in any two adjacent registers comprised in the traffic monitoring apparatus.

22. The apparatus according to claim 17, wherein the processor is further configured to: determine that a measured value of the target performance indicator of the second packet matches an updated value of the first information in the fourth register, and increase the value of the second information in the fourth register by 1.

23. The apparatus according to claim 22, wherein the processor is specifically configured to:
determine that the measured value of the target performance indicator of the second packet falls within a value range corresponding to the value of the first information in the fourth register.

24. The apparatus according to claim 22, wherein the processor is specifically configured to:

determine that a difference between the measured value of the target performance indicator of the second packet and the value of the first information in the fourth register is less than a difference between the measured value of the target performance indicator of the second packet and a value of the first information in another register.

25. The apparatus according to claim 17, wherein the processor is further configured to: determine that a measured value of the target performance indicator of the second packet does not match an updated value of the first information in the fourth register, update the value of the first information in the third register to the measured value of the target performance indicator of the second packet, and increase the value of the second information in the third register by 1.

26. An integrated circuit, comprising:
a control circuit; and
an interface circuit;
wherein the interface circuit is configured to receive a first packet;
wherein the control circuit is configured to determine whether the integrated circuit comprises a first register, wherein the first register comprises first information and second information, wherein the first information in the first register indicates a depth of a data bucket that carries a measured value of a target performance indicator of a to-be-monitored packet, and wherein the second information in the first register has a value of 0 and indicates a quantity of packets that are in packets received by the integrated circuit and that match a value of the first information in the first register; and
wherein the control circuit is further configured to: in response to determining that the integrated circuit comprises the first register, update the value of the first information in the first register to a measured value of the target performance indicator of the first packet, and increase the value of the second information in the first register by 1.

27. The integrated circuit according to claim 26, wherein the interface circuit is further configured to receive a second packet;
wherein the control circuit is further configured to determine whether the integrated circuit comprises a second register, wherein the second register comprises the first information and the second information, wherein the first information in the second register indicates a depth of a data bucket that carries a measured value of the target performance indicator of a to-be-monitored packet, and wherein the second information in the second register indicates has a value of 0 and a quantity of packets that are in the packets received by the integrated circuit and that match a value of the first information in the second register; and
wherein the control circuit is further configured to: in response to determining, by the integrated circuit, that the integrated circuit does not comprise the second register, update, according to a value of the first information in a third register comprised in the integrated circuit and a value of the second information in the third register, a value of the first information in a fourth register comprised in the integrated circuit and a value of the second information in the fourth register, wherein an updated value of the second information in the fourth register is equal to a sum of the value of the second information in the third register and the value of the second information in the fourth register; and clear the value of the second information in the third register.

28. The integrated circuit according to claim 27, wherein the third register is adjacent to the fourth register, and the sum of the value of the second information in the third register and the value of the second information in the fourth register is less than a first threshold.

29. The integrated circuit according to claim 27, wherein the third register is adjacent to the fourth register, and a weighted sum of the value of the second information in the third register and the value of the second information in the fourth register is less than a first threshold.

30. The integrated circuit according to claim 27, wherein the third register is adjacent to the fourth register, and the sum of the value of the second information in the third register and the value of the second information in the fourth register is not greater than a sum of values of the second information in any two adjacent registers comprised in the integrated circuit.

* * * * *